(12) United States Patent
Bevirt et al.

(10) Patent No.: US 12,459,658 B2
(45) Date of Patent: Nov. 4, 2025

(54) AIRCRAFT ELECTRIC MOTOR COOLING SYSTEM

(71) Applicant: Joby Aero, Inc., Santa Cruz, CA (US)

(72) Inventors: JoeBen Bevirt, Santa Cruz, CA (US); Gregor Veble Mikic, Santa Cruz, CA (US); Joey Milia, Palo Alto, CA (US); Rob Thodal, Santa Cruz, CA (US); Vishnu Vithala, Capitola, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 35 days.

(21) Appl. No.: 18/586,428

(22) Filed: Feb. 24, 2024

(65) Prior Publication Data

US 2024/0262517 A1    Aug. 8, 2024

Related U.S. Application Data

(63) Continuation of application No. 17/586,801, filed on Jan. 28, 2022, now Pat. No. 11,912,393, which is a continuation of application No. 16/355,745, filed on Mar. 16, 2019, now Pat. No. 11,312,471.

(60) Provisional application No. 62/694,910, filed on Jul. 6, 2018, provisional application No. 62/643,763, filed on Mar. 16, 2018.

(51) Int. Cl.
| | |
|---|---|
| *B64C 1/38* | (2006.01) |
| *B64C 23/00* | (2006.01) |
| *B64D 27/30* | (2024.01) |
| *B64D 27/31* | (2024.01) |
| *B64D 27/34* | (2024.01) |
| *B64D 29/02* | (2006.01) |
| *B64C 21/08* | (2023.01) |
| *B64C 27/32* | (2006.01) |

(52) U.S. Cl.
CPC ................ *B64D 29/02* (2013.01); *B64C 1/38* (2013.01); *B64C 23/005* (2013.01); *B64D 27/30* (2024.01); *B64D 27/31* (2024.01); *B64D 27/34* (2024.01); *B64C 21/08* (2013.01); *B64C 27/32* (2013.01); *B64C 2230/04* (2013.01)

(58) Field of Classification Search
CPC ......... B64C 1/38; B64C 21/08; B64C 23/005; B64C 27/32; B64C 2230/04
USPC ...................................... 244/117 A
See application file for complete search history.

(56) References Cited

U.S. PATENT DOCUMENTS

| | | | | |
|---|---|---|---|---|
| 3,977,817 A | * | 8/1976 | Monteil ................. | F01C 19/00 418/196 |
| 4,456,458 A | * | 6/1984 | Gilbertson ............. | B01D 45/04 55/306 |

(Continued)

*Primary Examiner* — Brady W Frazier
(74) *Attorney, Agent, or Firm* — Michael A. Guth

(57) ABSTRACT

An aircraft propulsion system with an internally cooled electric motor adapted for use in an aerial vehicle. The motor may have its stator towards the center and have an external rotor. The rotor structure may be air cooled and may be a complex structure with an internal lattice adapted for airflow. The stator structure may be liquid cooled and may be a complex structure with an internal lattice adapted for liquid to flow through. A fluid pump may pump a liquid coolant through non-rotating portions of the motor stator and then through heat exchangers cooled in part by air which has flowed through the rotating portions of the motor rotor. The drag reduction portion and the cooled electric motor portion may share the same inlet.

11 Claims, 29 Drawing Sheets

(56) References Cited

U.S. PATENT DOCUMENTS

| | | | | |
|---|---|---|---|---|
| 4,617,028 A * | 10/1986 | Ray | ............................ | F02C 7/05 |
| | | | | 55/306 |
| 5,413,010 A * | 5/1995 | Nakanishi | ............... | G01C 19/04 |
| | | | | 74/5.22 |
| 6,041,589 A * | 3/2000 | Giffin, III | ................ | F02K 3/075 |
| | | | | 60/226.3 |
| 2002/0028151 A1 * | 3/2002 | Manner | ..................... | F01C 1/22 |
| | | | | 418/15 |
| 2003/0113205 A1 * | 6/2003 | Negulescu | ................. | F02C 7/04 |
| | | | | 415/182.1 |
| 2008/0030086 A1 * | 2/2008 | Noda | ........................ | B61C 9/50 |
| | | | | 310/57 |
| 2012/0205999 A1 * | 8/2012 | Wilson, Jr. | ............ | H02K 5/1672 |
| | | | | 310/90 |
| 2013/0174533 A1 * | 7/2013 | Ribarov | .................. | B64C 11/48 |
| | | | | 415/60 |
| 2013/0265848 A1 * | 10/2013 | Wurz | ...................... | F15D 1/025 |
| | | | | 138/40 |
| 2014/0084756 A1 * | 3/2014 | Kalev | ...................... | H02K 7/09 |
| | | | | 310/67 R |
| 2014/0292120 A1 * | 10/2014 | Kalev | ..................... | H02K 7/025 |
| | | | | 310/74 |
| 2017/0023009 A1 * | 1/2017 | Roche | .................. | F04D 29/388 |
| 2018/0138766 A1 * | 5/2018 | Moore | ................... | B64D 27/34 |
| 2019/0148027 A1 * | 5/2019 | Rhyne | ...................... | F02C 1/05 |
| | | | | 376/317 |

* cited by examiner

AIRCRAFT ELECTRIC MOTOR COOLING SYSTEM

CROSS-REFERENCE TO RELATED APPLICATIONS

This application is a continuation of U.S. patent application Ser. No. 17/586,801 to Bevirt et al., filed Jan. 28, 2022, which is a continuation of U.S. patent application Ser. No. 16/355,745 to Bevirt et al., filed Mar. 16, 2019, which claims priority to U.S. Provisional Patent Application No. 62/643,763 to Bevirt et al., filed Mar. 16, 2018, and which claims priority to U.S. Provisional Patent Application No. 62/694,910 to Bevirt et al., filed Jul. 6, 2018, which are all hereby incorporated by reference in their entirety.

FIELD OF THE INVENTION

This invention relates to the aviation field, namely an aircraft propulsion system used on aerial vehicles.

SUMMARY

An aircraft propulsion system with a drag reduction portion adapted to reduce skin friction on at least a portion of the external surface of an aircraft. The drag reduction portion may include an inlet to ingest airflow. The aircraft may also have an internally cooled electric motor adapted for use in an aerial vehicle. The motor may have its stator towards the center and have an external rotor. The rotor structure may be air cooled and may be a complex structure with an internal lattice adapted for airflow. The stator structure may be liquid cooled and may be a complex structure with an internal lattice adapted for liquid to flow through. A fluid pump may pump a liquid coolant through non-rotating portions of the motor stator and then through heat exchangers cooled in part by air which has flowed through the rotating portions of the motor rotor. The drag reduction portion and the cooled electric motor portion may share the same inlet.

DETAILED DESCRIPTION

An aircraft propulsion system which can reduce drag on the rotor nacelles, and on the aircraft as a whole. A drag reduction portion may include ingesting air into the nacelle rearward of the rotor. The ingestion of air may thin or eliminate the turbulent boundary layer rearward of the ingested air inlet. The ingested air may also be used in a thermal management subsystem to aid in cooling of an electric motor used to power the aircraft. The thermal management subsystem may include heat exchange from a cooling liquid internal to the motor to the flowing air ingested from the air inlet. In some aspects, the ingested air is used solely for drag reduction. In some aspects, the ingested air is used both to reduce drag and to cool a motor of the aircraft.

In some aspects, the ingested air is used to reduce drag on the aircraft, and the ingested airflow is used to drive a fan coupled to a liquid pump which drives coolant through the motor, eliminating or reducing the need for electrical power to drive the thermal management of the motor. In some aspects, the ingested air may split into separate airflow paths, with a portion of the inletted air routed through the thermal management subsystem, and then routing through heat exchangers to cool the liquid used to cool the motor. This same air routed through the heat exchangers may then also drive a fan coupled the liquid pump, thus providing both convective cooling and driving the liquid flow in the cooling system of the motor. Another portion of the ingested air may bypass the motor cooling system. The use of the bypass allows for an increase in the volume of ingested air, which may allow for tuning of the amount of ingested air to reduce drag on the aircraft.

Figure 1A:
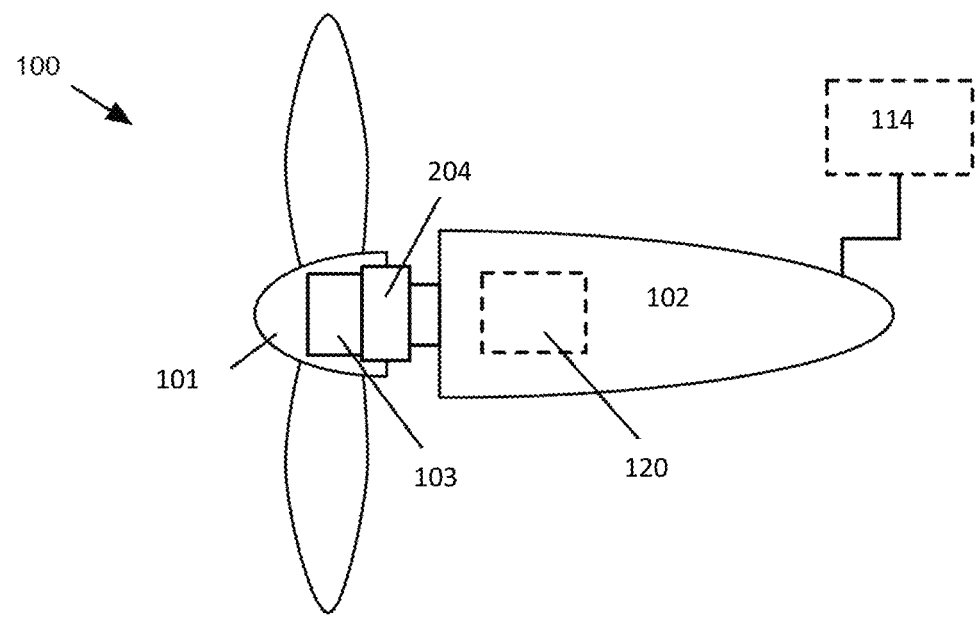
FIG. 1A is a sketch of a propulsion system according to some embodiments of the present invention.
Figure 1B:
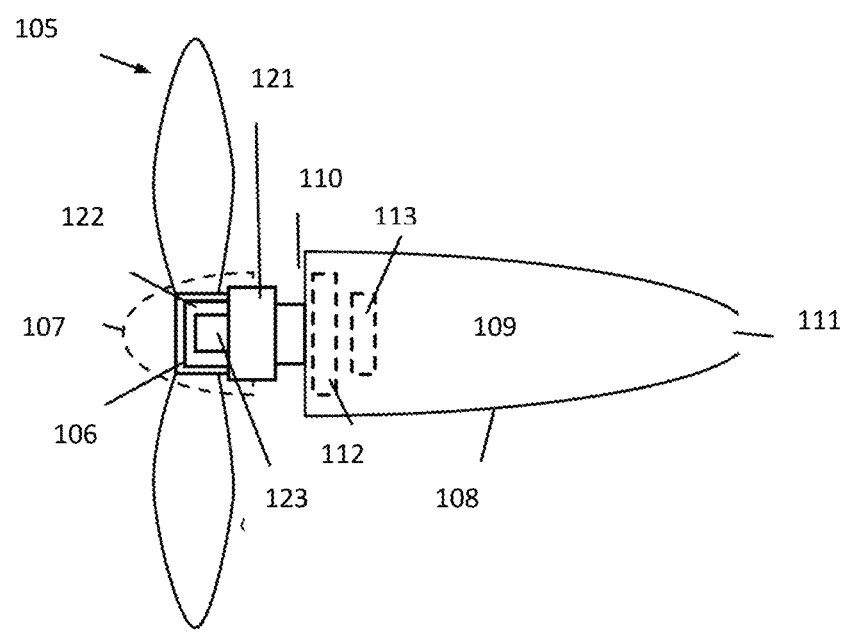
FIG. 1B is a sketch of a propulsion system according to some embodiments of the present invention.

As shown in FIGS. 1A-1B, the aircraft propulsion system 100 includes: a rotor 101, a nacelle 102 including a drag reduction portion, a drive mechanism 103 coupled to the rotor and the nacelle, and a thermal management subsystem 104 in thermal communication with the drive mechanism and the air surrounding the system. The rotor includes a set of blades 105 coupled to a hub 106 and defines a cowling 107. The nacelle 102 defines an outer surface 108 and a lumen 109, and the drag reduction portion includes an inlet 110 and an outlet 111, and can include a diffuser 112. The drive mechanism includes a rotary portion 122 rigidly coupled to the hub, and a fixed portion coupled to the nacelle. The thermal management subsystem 104 includes a liquid cooling mechanism 123 and a heat exchanger 121 (e.g., a radiator), and can include a flow actuator 113.

The system 100 can optionally include: a tilt mechanism 120 housed at least partially in the lumen of the nacelle, a power supply 114, and any other suitable components. The system 100 can function to reduce skin friction on at least a portion of the external surface of an aircraft. The system can manipulate airflow (e.g., external airflow, internal airflow, etc.) to convectively cool system components. The system can additionally or alternatively function to: ingest the boundary layer formed on the aircraft surface (e.g., at a location between a rotor and nacelle of the aircraft propulsion system); and perform any other suitable function.

The aircraft propulsion system can be used in conjunction with a rotorcraft. The rotorcraft is preferably a tiltrotor aircraft with a plurality of aircraft propulsion systems (e.g., rotor assemblies, rotor systems, etc.), operable between a forward arrangement and a hover arrangement. However, the rotorcraft can alternatively be a fixed wing aircraft with one or more rotor assemblies, a helicopter with one or more rotor assemblies (e.g., wherein at least one rotor assembly or aircraft propulsion system is oriented substantially axially to provide horizontal thrust), and/or any other suitable rotorcraft or vehicle propelled by rotors. The rotorcraft preferably includes an all-electric powertrain (e.g., battery powered electric motors) to drive the one or more rotor assemblies, but can additionally or alternatively include a hybrid powertrain (e.g., a gaselectric hybrid including an internal-combustion generator), an internal-combustion powertrain (e.g., including a gas-turbine engine, a turboprop engine, etc.), and any other suitable powertrain.

The term "rotor" as utilized herein, in relation to the aircraft propulsion system or otherwise, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

As shown in FIGS. 1A and 1B, the aircraft propulsion system 100 includes: a rotor, a nacelle, a drive mechanism coupled to the rotor and the nacelle, and a thermal management subsystem in thermal communication with the drive mechanism and the air surrounding the system. The rotor includes a set of blades coupled to a hub. The nacelle defines an outer surface, a lumen, an inlet, a diffuser, and an outlet. In some aspects, the nacelle may have a first outlet for air which has travelled through the thermal management subsystem, and a second outlet for air which has bypassed the thermal management subsystem. The drive mechanism includes a rotary portion rigidly coupled to the hub, and a fixed portion coupled to the nacelle. The thermal management susystem includes a liquid cooling mechanism and a heat exchanger (e.g., a radiator), and can include a flow actuator.

The system 100 can optionally include: a tilt mechanism housed at least partially in the lumen of the nacelle, a power supply, and any other suitable components. The rotor functions to rotate in a fluid under the power of the drive mechanism in order to provide thrust (e.g., to an attached aircraft). The rotor includes a set of blades coupled to a hub, and a cowling, or spinner, that at least partially encloses the hub. The rotor can optionally include any suitable components for supporting and/or controlling surfaces of the rotor (e.g., linkages and/or actuators for varying blade pitch, structural elements for retaining the set of blades and/or hub, etc.).

The set of blades functions to transfer the rotational momentum of the rotor to the fluid, resulting in at least a portion of the fluid having axial momentum (e.g., to provide thrust). The rotor can have any suitable number of blades; the rotor preferably has five blades, but can alternatively have three blades, four blades, six blades, and any other suitable number of blades. The blades can be rigidly fixed to a hub, fixed to a hub and include variable pitch capability (e.g., by way of a suitable variable pitch linkage, cyclic pitch control, etc.), and/or connected to a hub or rotor head by one or more hinges (e.g., a drag hinge, a flap hinge, etc.) to enable blades to lead, lag, and/or flap relative to the hub or rotor head during rotation of the rotor under aerodynamic loading. However, the blades can be otherwise suitably coupled to one another and/or otherwise suitably mechanically linked to form at least a portion of the rotor. In a specific example, the rotor includes five variable-pitch blades; in alternative examples, the rotor can have any suitable number of blades having variable- or fixed-pitch.

The rotor blades are preferably unconstrained at the blade tips (e.g., by any sort of physical structure), but the rotor can additionally or alternatively include a fairing that encloses the blade tips (e.g., such as the duct of a ducted fan). In such variations, the fairing can function to dampen the acoustic signature components (e.g., acoustic waves) that originate from the blade tips during rotation. However, the rotor blades can additionally or alternatively be constrained or unconstrained in any suitable manner.

The hub functions to mutually couple the set of blades and provide a region at which the rotor couples to the drive mechanism and receives rotary power (e.g., shaft power) therefrom. In variations, the hub can define at least part of the rotary portion of the drive mechanism (e.g., the rotor of an electric motor including a rotor and a stator, a part of the rotor of the electric motor, etc.). In further variations, the hub can directly or indirectly couple to an output shaft of the drive mechanism.

The cowling functions to define the foremost point of contact of the rotor with the external fluid (e.g., surrounding air), the surface upon which a boundary layer forms during aircraft motion, and the wetted surface of the rotor aside from that of the set of blades. The cowling also functions to define an internal lumen to house all or part of elements of the propulsion system (e.g., the drive mechanism, the thermal management subsystem, the hub, etc.).

The cowling is preferably shaped to minimize drag. In variations, the cowling rotates with the rotor relative to the nacelle and is separated from the nacelle by a gap. The gap can define at least a portion of the inlet to the nacelle (e.g., an annular inlet, a segmented partial annulus, etc.). In alternative variations, the cowling and/or portions thereof can remain static relative to the nacelle (e.g., wherein the cowling defines a slot through which the set of blades rotates) during rotor operation. The diameter of the cowling in the forward-projected direction is preferably less than the diameter of the foremost point of the nacelle (e.g., the point of the nacelle closest to the cowling) in the forward-projected direction; however, the diameter of the cowling can alternatively be greater than the diameter of the foremost point of the nacelle in the forward-projected direction, substantially equal to the diameter of the foremost point of the nacelle in the forward-projected direction, or otherwise suitably sized in variations of the aircraft propulsion system.

The nacelle functions to house components of the aircraft propulsion system, and to define the outer surface (e.g., wetted surface, external surface) of the portions of the aircraft propulsion system downstream from the rotor. The nacelle can also function to ingest an external flow and internally decelerate the flow (e.g., via a diffuser) before egesting the flow (e.g., via an outlet). The nacelle defines an outer surface and a lumen and can include a drag reduction portion, wherein the drag reduction portion can define an inlet, a diffuser, and/or an outlet. The nacelle should be understood to include any structural portion of the airframe (e.g., the nose, the wing, the tail section, etc.) arranged aft of and structurally supporting the drive mechanism and the rotor, and any other suitable components of the aircraft propulsion system.

In variations, the nacelle is a distinct structural member from the wing and/or tail section to which the nacelle is attached (e.g., rigidly mounted, rotatably coupled via a tilt mechanism, etc.). In such variations, the nacelle is preferably not configured as a lifting body but can additionally or alternatively be configured to provide at least some lift to the aircraft during flight. In alternative variations, the nacelle can be integrated with the wing and/or tail section to which the nacelle is attached. In such variations, the nacelle can define a lifting and/or control surface (e.g., act as a part of the wing and/or tail section). However, the nacelle can be otherwise suitably configured and/or arranged in relation to the aircraft.

The outer surface functions to separate the internal features and components of the nacelle from the external airflow. The outer surface can also function to define at least a portion of the inlet and/or outlet. The outer surface can also function to define the wetted surface (e.g., substantially all of the wetted surface, most of the wetted surface, etc.) of the aircraft propulsion system aft of the rotor. The outer surface can also function to define a geometry that minimizes drag (e.g., encourages laminar boundary layer formation and maintenance, prevents flow separation, etc.). The outer surface is preferably shaped to promote laminar flow, which can include: defining a cross section that minimizes static pressure recovery along the surface in the axial direction, which can lead to undesirable flow separation; accelerating the flow along a maximized downstream portion of the outer surface (e.g., maintaining a negative pressure gradient oriented along the outer surface direction) to promote laminar boundary layer stability; and/or any other suitable geometric features configured to promote laminar flow along a maximal portion of the nacelle outer surface.

The lumen functions to define a volume that retains components of the aircraft propulsion system and/or other aircraft subsystems. Such retained components can include, in variations, at least a portion of a tilt mechanism, all or a portion of the power supply, power delivery subsystems (e.g., electrical power distribution cables, conduits, etc.), mechanical actuators (e.g., for actuating control surfaces of the aircraft), all or a portion of the drive mechanism, and any other suitable components.

The drag reduction portion functions to reduce drag on the aircraft propulsion system, and thus on the aircraft as a whole, during flight operations. The drag reduction portion is preferably configured to reduce drag during forward flight (e.g., operation of the aircraft in the forward arrangement, operation of the aircraft propulsion system in the forward configuration, etc.), but can additionally or alternatively reduce drag during any suitable operating mode of the aircraft (e.g., hover, vertical take-off and/or landing, forward motion of the aircraft with at least a subset of aircraft propulsion systems of the aircraft between the forward and hover configurations, etc.). The drag reduction portion includes an inlet and an outlet; the drag reduction mechanism can optionally include a diffuser and/or a bypass.

In some aspects, an aerial vehicle may use bladed propellers powered by electric motors to provide thrust during take-off. The propeller/motor units may be referred to as rotor assemblies. In some aspects, the wings of the aerial vehicle may rotate, with the leading edges facing upwards, such that the propellers provide vertical thrust for take-off and landing. In some aspects, the motor driven propeller units on the wings may themselves rotate relative to a fixed wing, such that the propellers provide vertical thrust for take-off and landing. The rotation of the motor driven propeller units may allow for directional change of thrust by rotating both the propeller and the electric motor, thus not requiring any gimbaling, or other method, of torque drive around or through a rotating joint.

In some aspects, aerial vehicles according to embodiments of the present invention take off from the ground with vertical thrust from rotor assemblies that have deployed into a vertical configuration. As the aerial vehicle begins to gain altitude, the rotor assemblies may begin to be tilted forward in order to begin forward acceleration. As the aerial vehicle gains forward speed, airflow over the wings results in lift, such that the rotors become unnecessary for maintaining altitude using vertical thrust. Once the aerial vehicle has reached sufficient forward speed, some or all of the blades used for providing vertical thrust during take-off may be stowed along their nacelles. In some aspects, all rotor assemblies used for vertical take-off and landing are also used during forward flight. The nacelle supporting the rotor assemblies may have recesses such that the blades may nest into the recesses, greatly reducing the drag of the disengaged rotor assemblies.

After take-off, the aerial vehicle will begin a transition to forward flight by articulating the rotors from a vertical thrust orientation to a position which includes a horizontal thrust element. As the aerial vehicle begins to move forward with speed, lift will be generated by the wings, thus requiring less vertical thrust form the rotors. As the rotors are articulated further towards the forward flight, horizontal thrust, configuration, the aerial vehicle gains more speed.

The electric motor/propeller combination being on the outboard side of the articulating joint allows for a rigid mounting of the propeller to the motor, which is maintained even as the propeller is moved through various attitudes relative to the rear nacelle portion. With such a configuration the rotating power from the motor need not be gimbaled or otherwise transferred across a rotating joint. The deployment is of the entire motor driven rotor in some aspects.

Figure 2A:
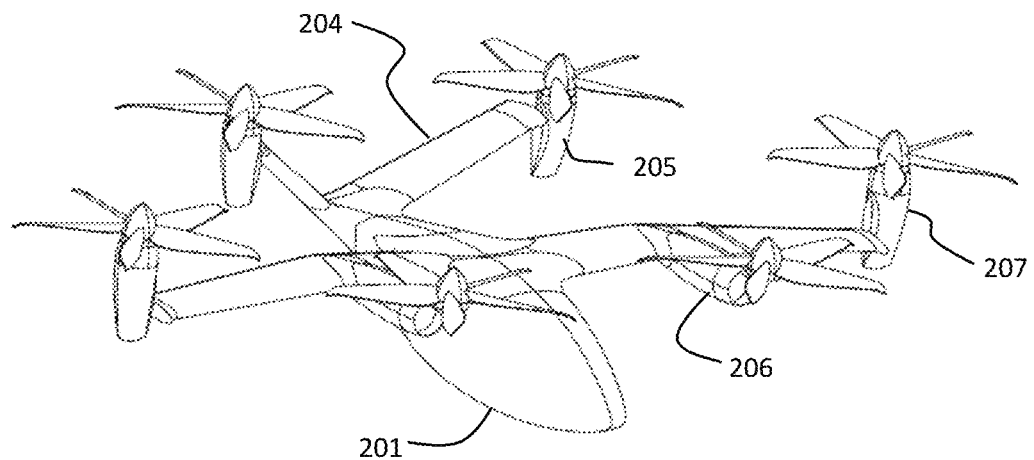
FIG. 2A is a vertical take-off and landing aircraft in a take-off configuration according to some embodiments of the present invention.

In a first vertical configuration according to some embodiments of the present invention, as seen in a vertical take-off configuration in FIG. 2A, an aerial vehicle 200 uses fixed wings 202, 203, which may be forward swept wings, with rotors of the same or different types adapted for both vertical take-off and landing and for forward flight. The aircraft body 201 supports a left wing 202 and a right wing 203. Motor driven rotor assemblies 206, 207 on the wings include propellers which may stow and nest into the nacelle body. The aircraft body 201 extends rearward is also attached to raised rear stabilizers 204. The rear stabilizers have rear rotor assemblies 205 attached thereto. Although two passenger seats are anticipated, other numbers of passengers may be accommodated in differing embodiments of the present invention.

In some aspects, all or a portion of the wing mounted rotors may be adapted to be used in a forward flight configuration, while other wing mounted rotors may be adapted to be fully stowed during regular, forward, flight. The aerial vehicle 200 may have four rotors on the right wing 203 and four rotors on the left wing 202. The inboard rotor assemblies on each wing may have wing mounted rotors 206 that are adapted to flip up into a deployed position for vertical take-off and landing, to be moved back towards a stowed position during transition to forward flight, and then to have their blades stowed, and nested, during forward flight. The outboard rotor assembly 207 may pivot in unison from a horizontal to a vertical thrust configuration.

Similarly, the each rear stabilizer 204 may be have rotor units mounted to it, both of which are adapted to be used during vertical take-off and landing, and transition, modes. In some aspects, all of the rotor designs are the same, with a subset used with their main blades for forward flight. In some aspects, all of the rotor designs are the same, with all rotors used for forward flight. In some aspects, there may be a different number of rotor units mounted to the rear stabilizer 204.

In some embodiments, the electric motors of the aerial vehicle are powered by rechargeable batteries. The use of multiple batteries driving one or more power busses enhances reliability, in the case of a single battery failure. In some embodiments, the batteries may be spread out along the rotating portion, and there may be one battery for each of the motor/ducted fan assemblies. In some embodiments, the battery or batteries may reside in part or fully within the aircraft body, with power routed out to the motors through the rotational couplings. In some embodiments, the batteries reside within the vehicle body on a rack with adjustable position such that the vehicle balance may be adjusted depending upon the weight of the pilot.

Figure 2B:
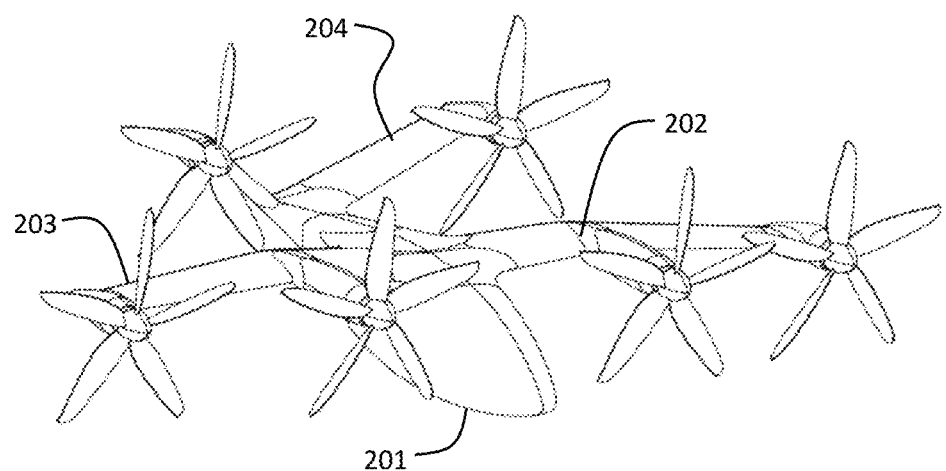
FIG. 2B is a vertical take-off and landing aircraft in a forward flight configuration according to some embodiments of the present invention.

FIG. 2B illustrates the aerial vehicle 200 in a forward flight configuration.

Figure 3A:
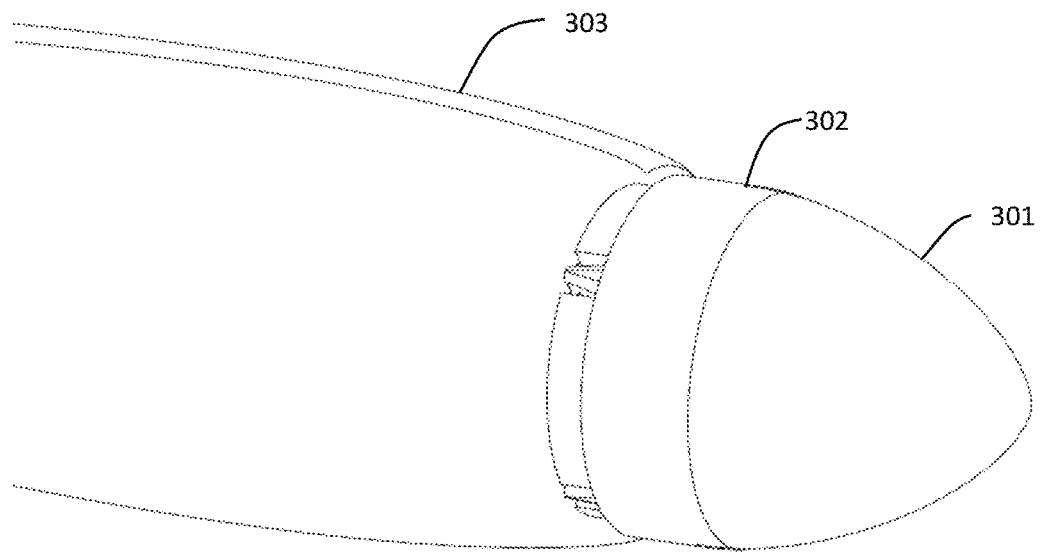
FIG. 3A is a partial cutaway view of a nacelle and rotor according to some embodiments of the present invention.
Figure 3B:
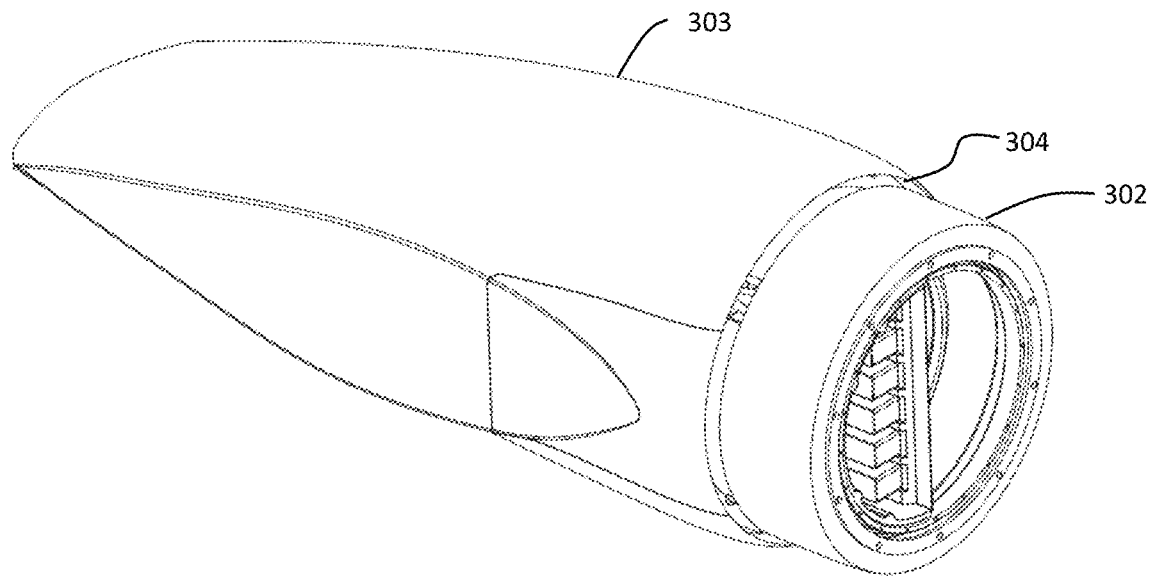
FIG. 3B is a partial cutaway view of a nacelle and rotor according to some embodiments of the present invention.

FIG. 3A illustrates, in partial view, a nacelle 303 which provides aerodynamic cover for support structure for a motor driven rotor assembly according to some embodiments of the present invention. A spinner, or cowling, 301 is mounted forward of the rotor 302 (propeller not shown in this view). FIG. 3B is a drawing of a nacelle 303 showing the rotor with some other portions omitted for clarity. In some aspects, the nacelle may be a multi-piece nacelle adapted to allow for the forward portion of the nacelle to transition from a forward facing horizontal configuration to a vertical take-off and landing configuration with the use of an internally mounted deployment mechanism. In some aspects, the nacelle may be a wingtip mounted nacelle which is adapted to transition between a horizontal and vertical flight configuration by rotating around a central pivot hub.

The rotor 302 rotates around an internal stator. An air gap 304 between the external surface of the rotor 302 and the nacelle 303 allows for the inletting of air into the inside of the nacelle. In some aspects, the external circumferential surface of the nacelle 302 will also have air inlets which allow for the routing of air into the inner area of the rotor structure. In some aspects, the external rotor structure has exterior face skin surfaces with a lattice work of interior support between the face skin surfaces, which allow for the flow of air and cooling of the structure using the flow of this air. The air flowing through this rotor structure exits out of the structure in an area adjacent to the inflow air through the air gap 304. These airflows are then available to flow through heat exchangers which cool liquid which has flowed through the internal stator of the motor. In some aspects, the external rotor structure will not allow for airflow within the external rotor structure. The air flow inletted through the air gap 304 may work to lower drag of the aerial vehicle.

Figures 3C, 3D:
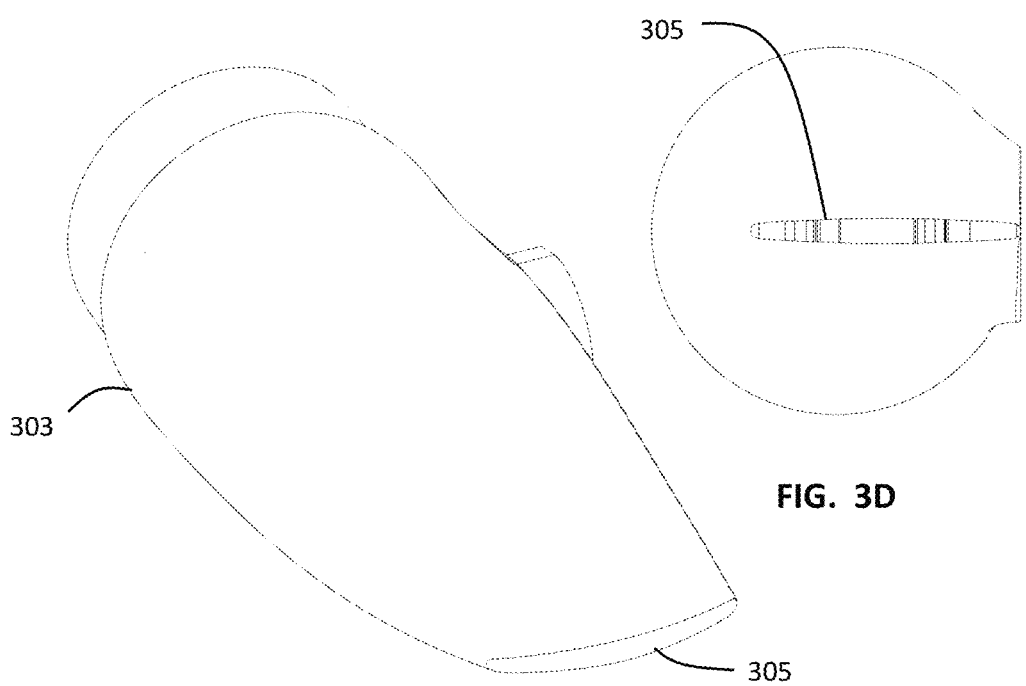
FIG. 3C is a partial rear view of a nacelle according to some embodiments of the present invention.
FIG. 3D is a partial rear view of a nacelle according to some embodiments of the present invention.
Figure 4A:
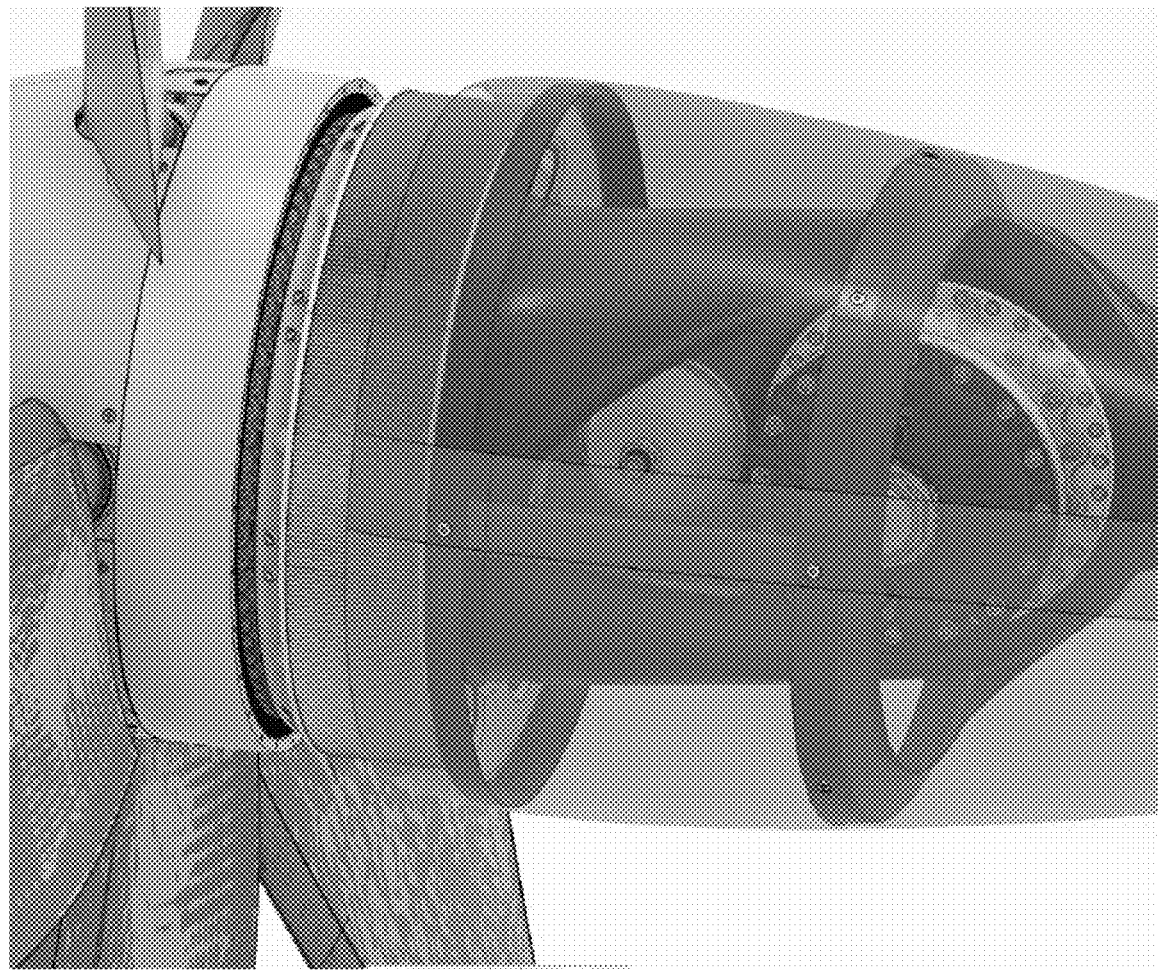
FIG. 4A is a shaded partial view of a nacelle and rotor according to some embodiments of the present invention.
Figure 4B:
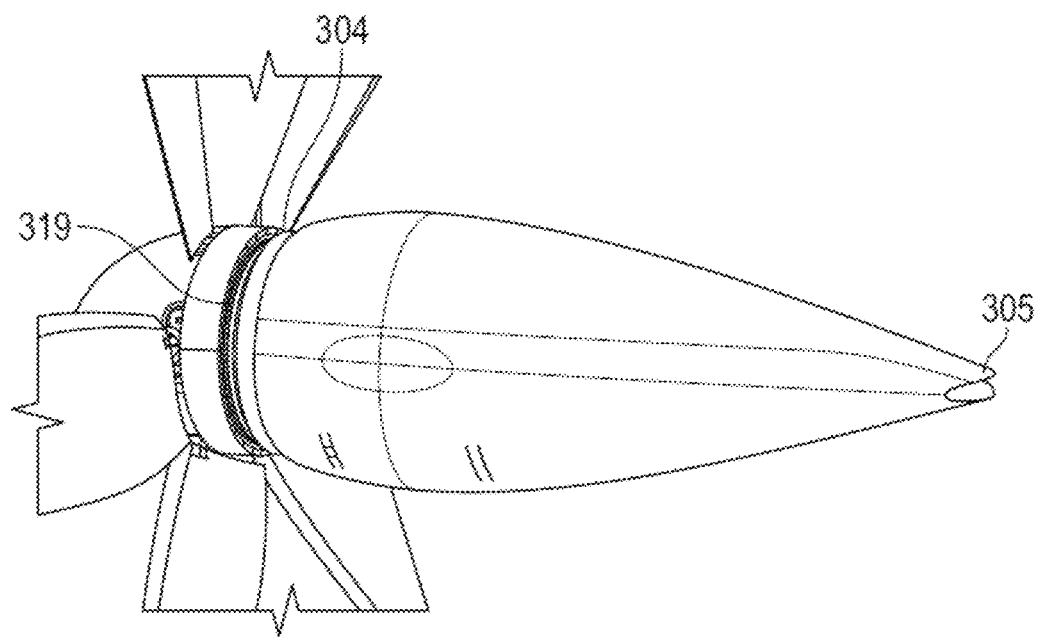
FIG. 4B is a view of a nacelle and rotor according to some embodiments of the present invention.
Figure 4C:
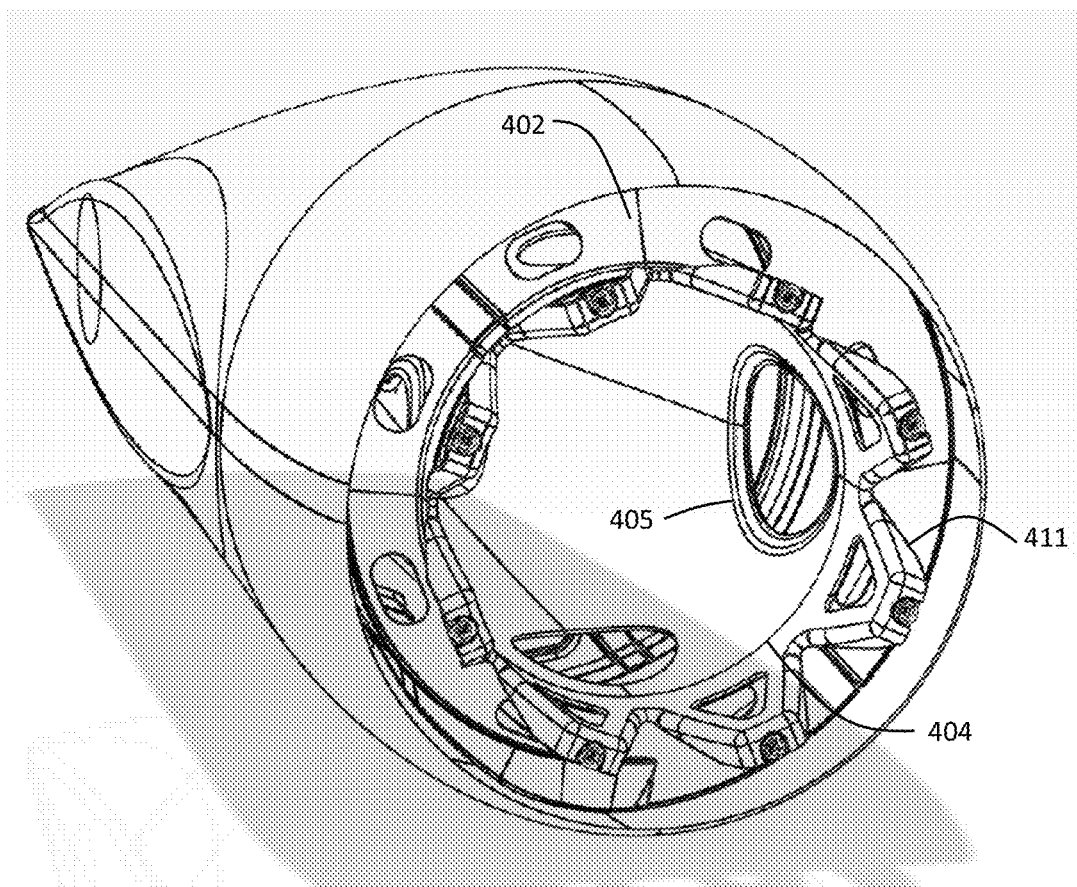
FIG. 4C is a view of the interior of a nacelle according to some embodiments of the present invention.
Figure 5A:
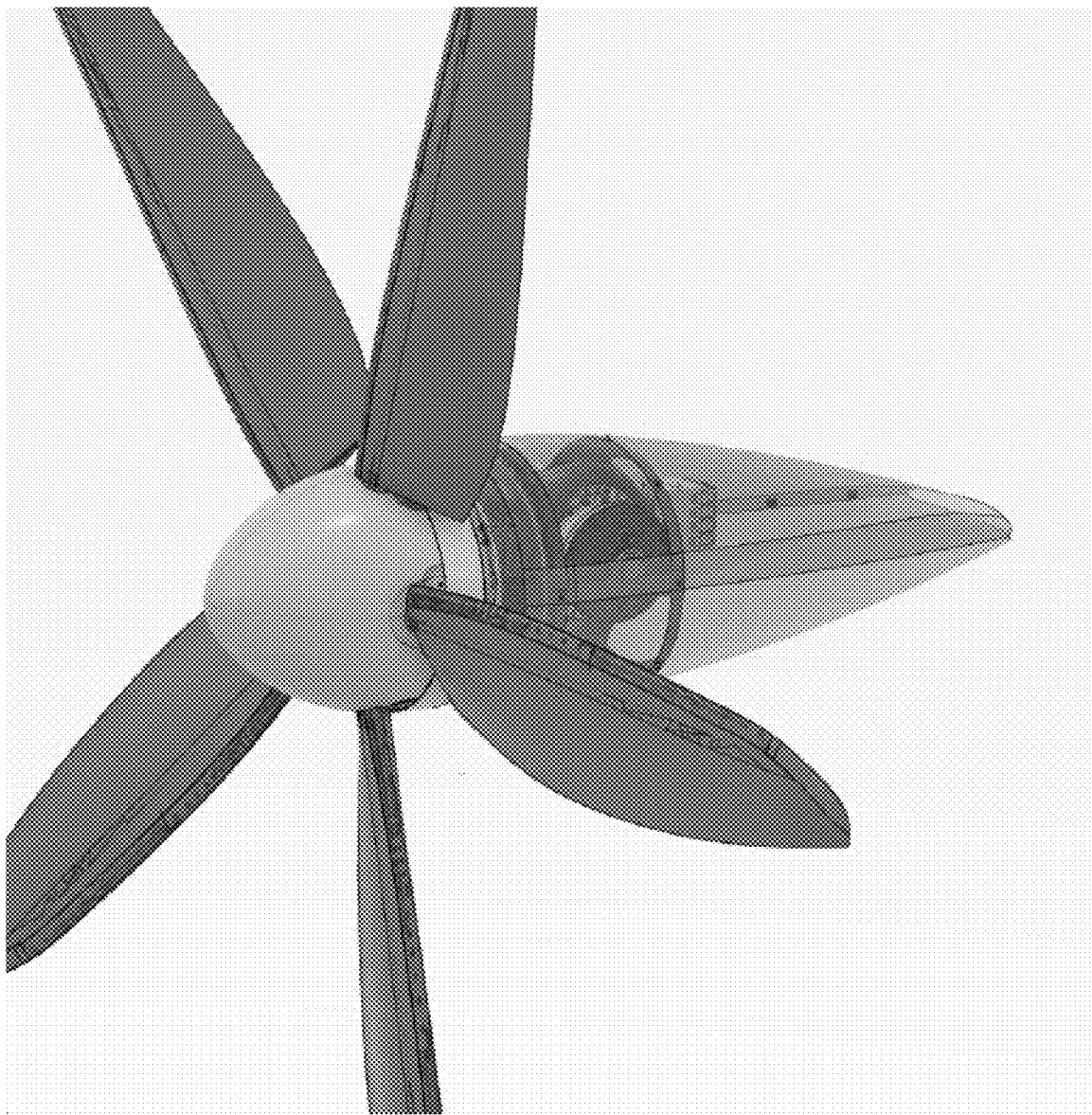
FIG. 5A is a shaded view of a nacelle and rotor according to some embodiments of the present invention.
Figure 5B:
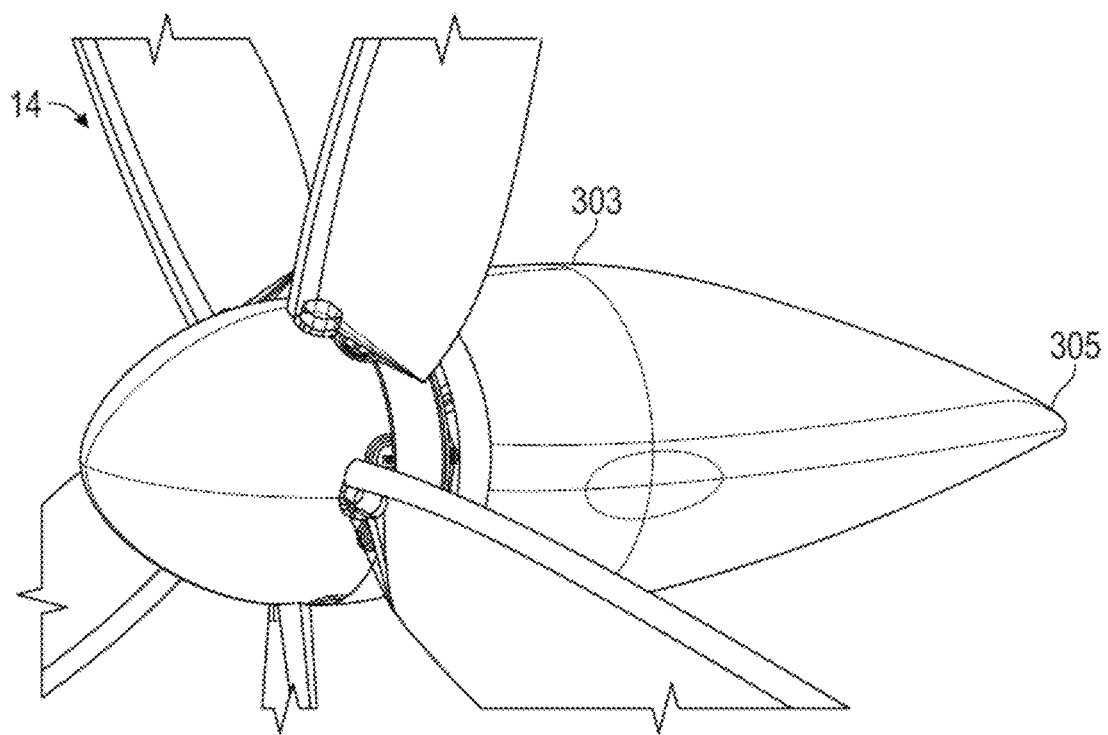
FIG. 5B is a shaded view of a nacelle and rotor according to some embodiments of the present invention.

FIGS. 3C and 3D are drawings of the rear portion of a nacelle 303. A rear airflow exit 305 allows for the exit of the inflow air which has entered the nacelle through the air gap 304 and through the rotor structure. In some aspects, the nacelle 303 may be a split nacelle with an interior deployment mechanism, which may split as the nacelle and motor driven assembly transition from a forward flight configuration to a vertical take-off and landing configuration. Once the nacelle is split, the air exiting from the motor area may exit through the gap creating in splitting the nacelle. In some aspects, the nacelle may be a solid nacelle, and the transition from a forward flight configuration to a vertical take-off and landing configuration involves rotating the entire nacelle around a fixed pivot. In some aspects, an aerial vehicle may have a combination of motor driven rotor assemblies, some of which have splitting nacelle and some rotating around a fixed pivot. In some aspects, as discussed below, there may be one or more additional outlets.

FIGS. 4A, 4B, 4C, 5A, and 5B illustrate a rotor assembly 205 according to some embodiments of the present invention. In this illustrative embodiment, the propeller and cowling are coupled to the rotating structure 302 and reside forward of the nacelle 303. Air is able to enter into heat exchangers 319 in area forward of the nacelle 303 and rearward of the rotor. In some aspects, the front rim of the nacelle 303 defines an air gap 304 which allows air flow into the nacelle. In this embodiment, all of the air that flows into the interior of the nacelle flows through heat exchangers 319 before exiting via the airflow exit 305. A blocking structure 402 at the back end of the heat exchanger air flow openings blocks air from flowing further rearward into the nacelle past the heat exchanger. Although the blocking structure is illustrated with some oval openings in FIG. 4C, for example, it is anticipated that these openings will provide access for items such as electrical wiring and will be otherwise impervious to airflow when in use. Air flows into the heat exchangers 319 and then into the inside of the interior structure 404 within the nacelle. The airflow may then exit the inside of the interior structure 404 through vent holes 405, and then flow within the nacelle 303 and out the airflow exit 305. A deployment mechanism 403 is adapted to pivot the rotor assembly from a forward flight configuration to a vertical take-off and landing configuration. The support structure 411 supports the heat exchangers and also allows airflow that has flowed through the heat exchangers to enter then into the interior structure 404 of the nacelle.

Figure 6A:
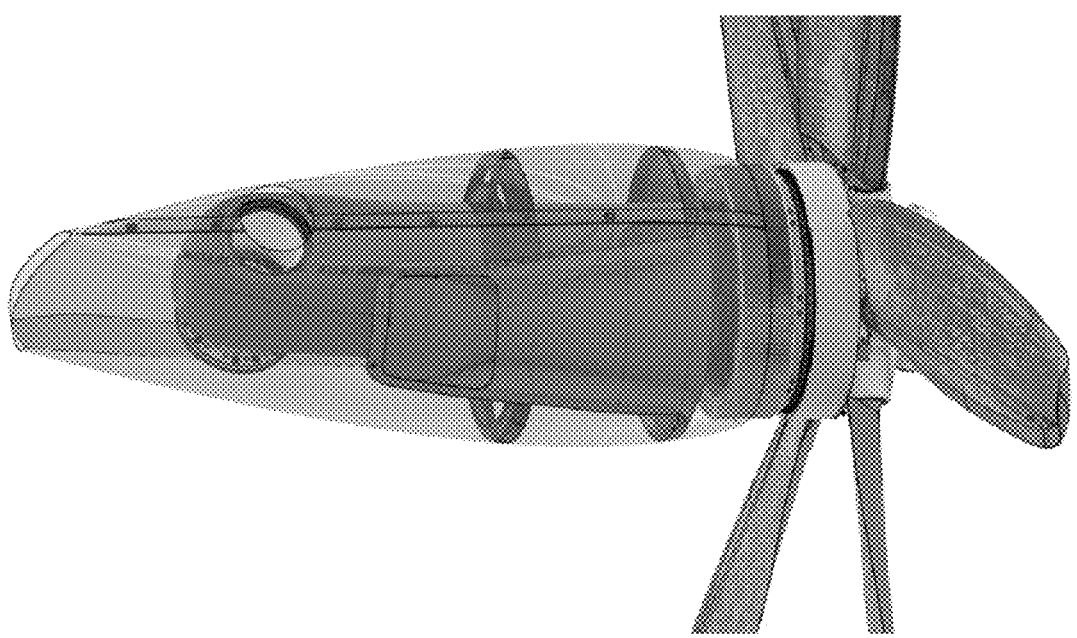
FIG. 6A is a shaded view of a rotor and a nacelle with bypass according to some embodiments of the present invention.
Figure 6B:
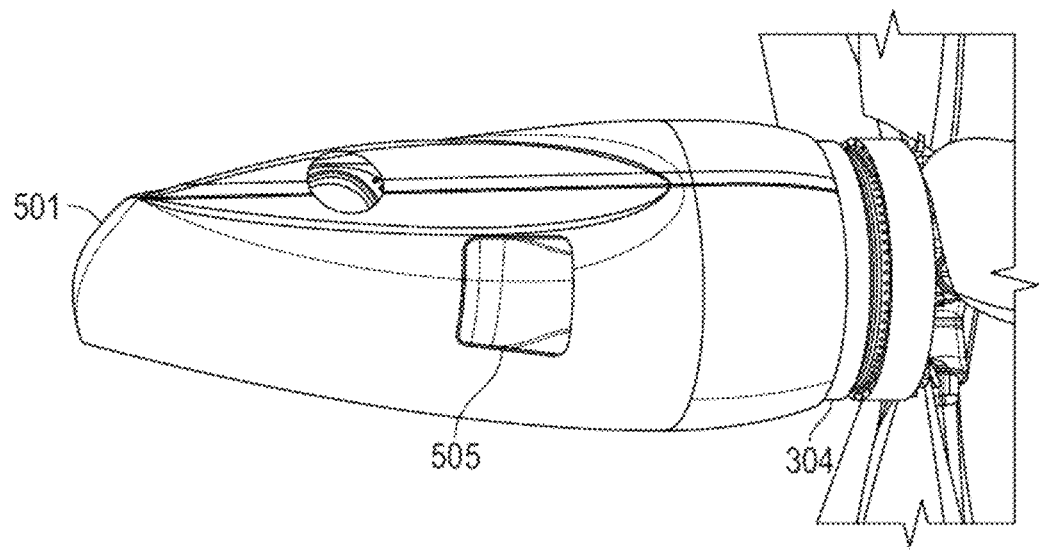
FIG. 6B is a view of a rotor and a nacelle with bypass according to some embodiments of the present invention.
Figure 6C:
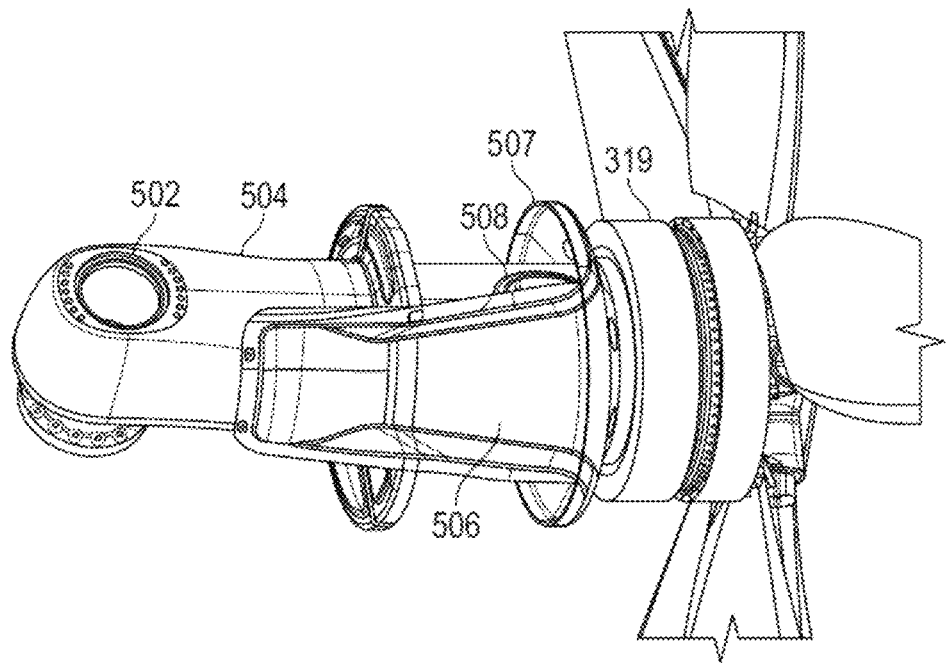
FIG. 6C is a partial cutaway view of a rotor and a nacelle with bypass according to some embodiments of the present invention.
Figure 7A:
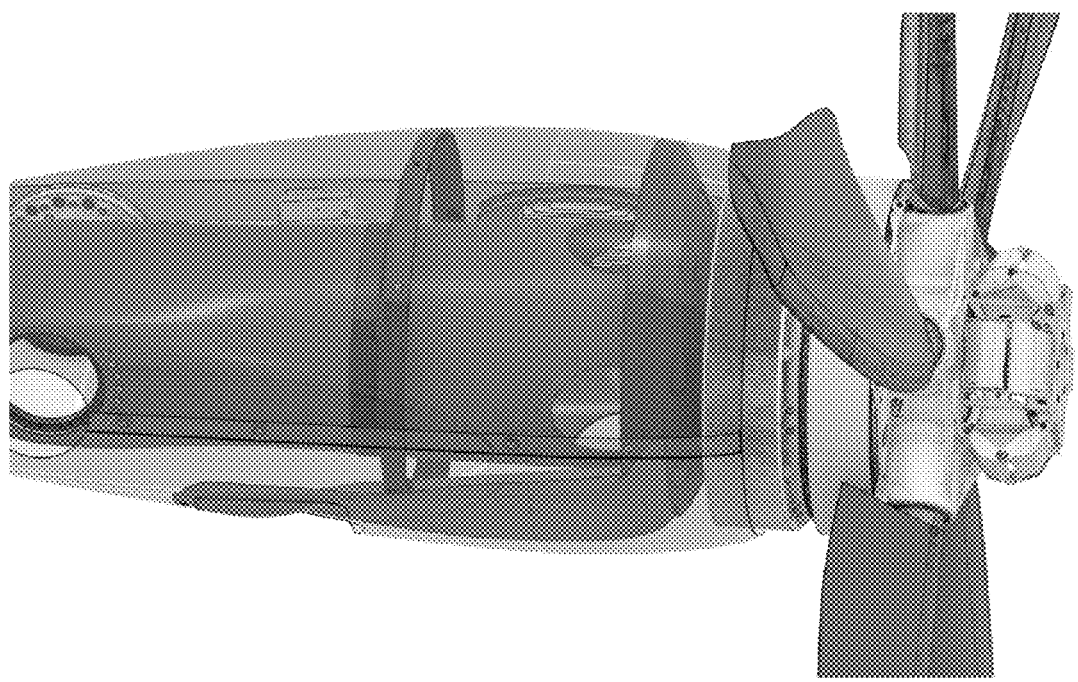
FIG. 7A is a shaded view of a rotor and a nacelle with bypass according to some embodiments of the present invention.
Figure 7B:
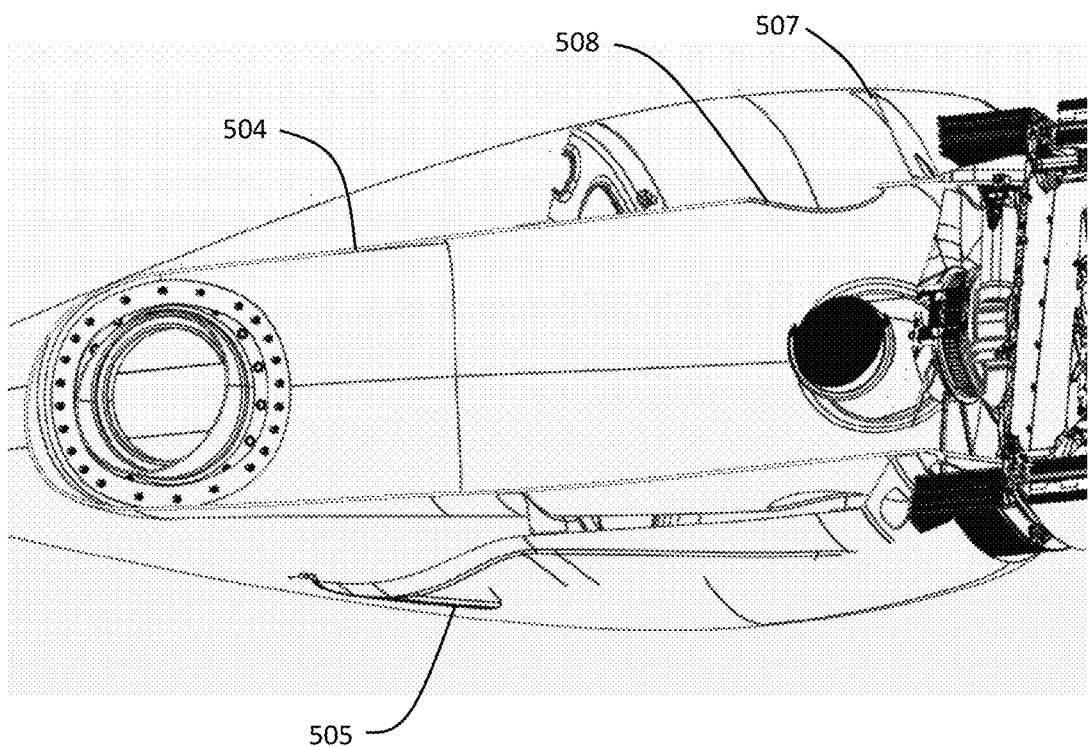
FIG. 7B is a view of a rotor and a nacelle with bypass according to some embodiments of the present invention.

FIGS. 6A, 6B, 7A, and 7B illustrate an embodiment of a rotor assembly 207 wherein the airflow may flow through the heat exchangers and then flow out through a main airflow exit 501, but may also allow a bypass stream to flow past the inlets of the heat exchangers 319 and be routed out through a bypass exit 505. FIG. 6C illustrates the rotor assembly with the outer nacelle surface removed for clarity of viewing. In this illustrative embodiment, airflow enters through the ring gap 304. A portion of the airflow may route past the entrance to the heat exchangers and into an area behind the heat exchangers where its rearward flow is blocked by a bypass blocking structure 507. A bypass duct 506 is fluidically coupled to the area rearward of the heat exchangers and forward of the bypass blocking structure 507. The bypass duct allows the bypass stream to continue out to the bypass exit 505. The nacelle may be pivotable around a pivot 502 to transition from a forward flight configuration to a vertical take-off and landing configuration.

The addition of a bypass stream allows for a larger volume of air to be inletted through the ring gap than may be able to be used by, or that would be needed by, the thermal management subsystem. This ability to allow for a larger volume of air flow may allow the user to tune the drag reduction portion to lower energy loss of the aircraft. As discussed below, in some aspects the ratio of the volume flow rate of the inletted airflow relative to the volume flow rate of the boundary layer forward of the inlet may be set in order to reduce drag. In some aspects, in order to allow for more inletted airflow, a bypass stream is utilized.

Another portion of the airflow into the ring gap 304 may enter the heat exchangers 319 and exit within the interior of an inner nacelle structure 504. The inner nacelle structure 504 may have airflow passages 508 adapted to allow the air within the inner nacelle structure to exit the interior of the inner nacelle structure and travel within the interior of the nacelle 503. The air within this area of the nacelle may then continue out of the nacelle through a main airflow exit 501.

Figure 8:
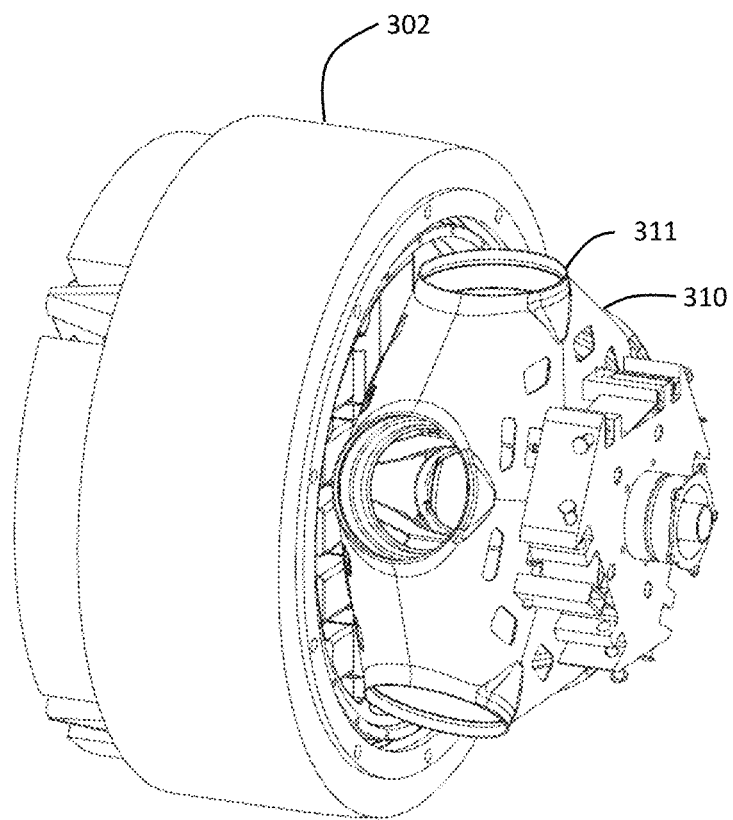
FIG. 8 is a view of a rotor and propeller hub according some embodiments of the present invention.

FIG. 8 is a drawing of a motor and propeller hub, with some parts omitted for clarity. The propeller hub 310 is mounted to the rotor 302 and rotates in unison with the rotor. The propeller hub has propeller interfaces 311 spaced around its periphery.

Figure 9A:
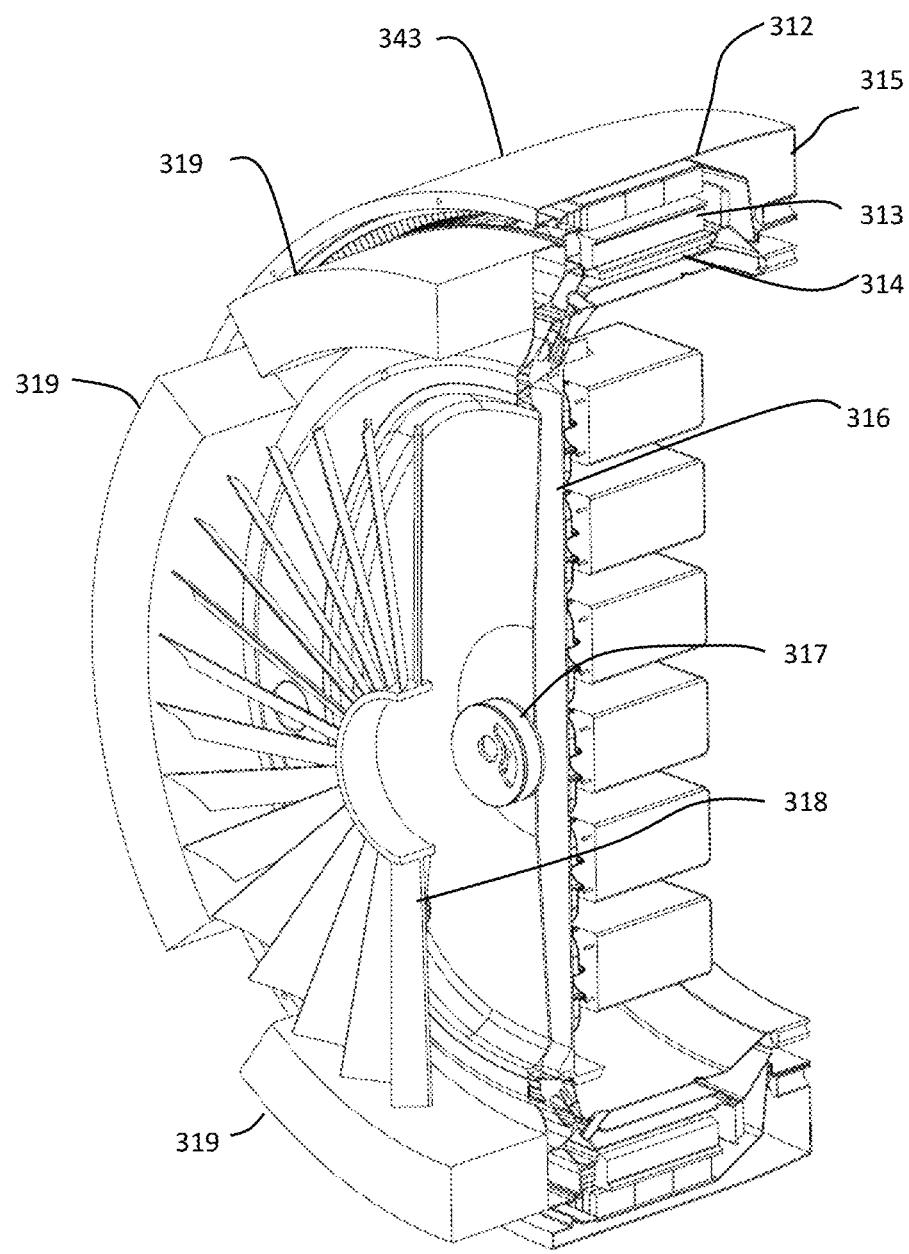
FIG. 9A is a partial cutaway view of a motor with liquid cooling according to some embodiments of the present invention.
Figure 9B:
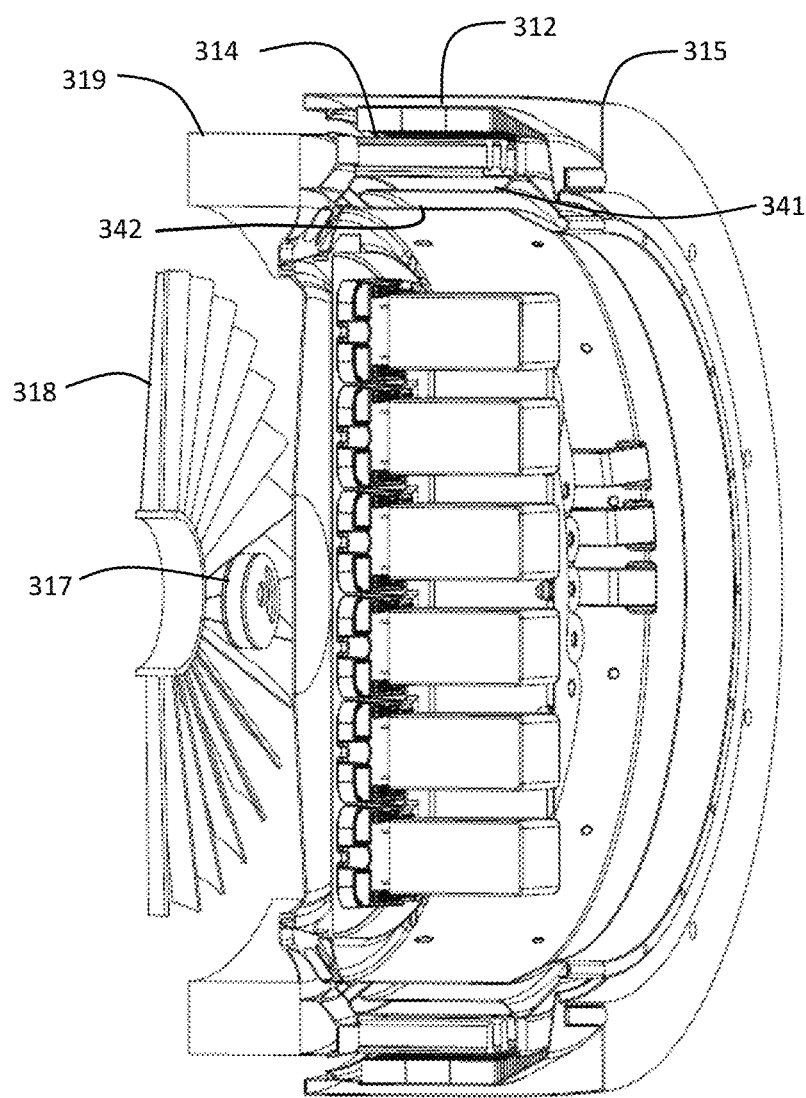
FIG. 9B is a partial cutaway view of a motor with liquid cooling according to some embodiments of the present invention.
Figure 9C:
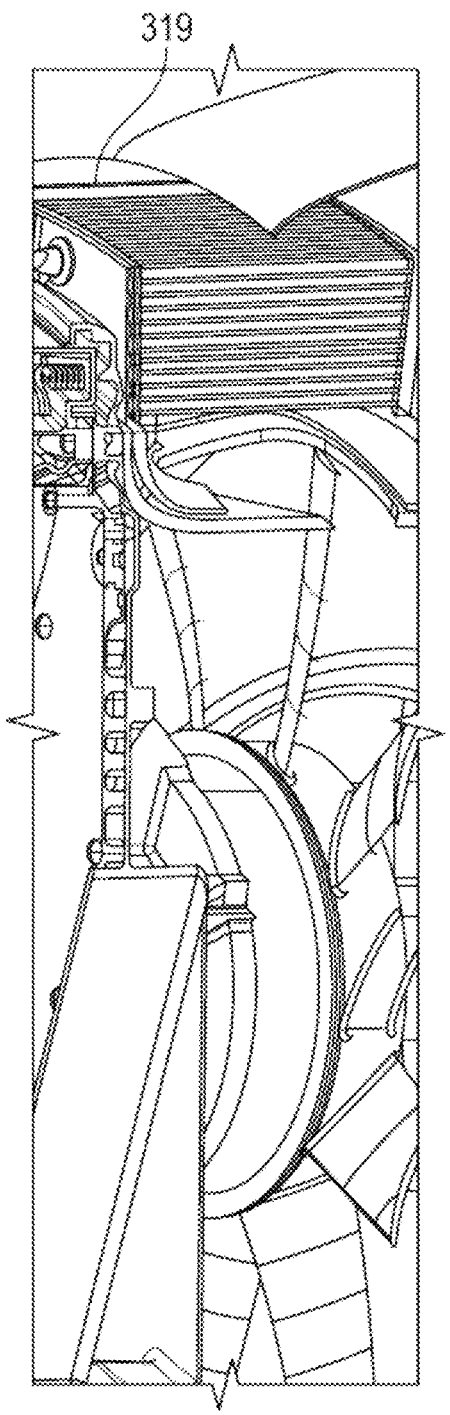
FIG. 9C is a partial cutaway view of a motor with liquid cooling and associated heat exchangers according to some embodiments of the present invention.

In some embodiments of the present invention, as seen in cutaway view in FIGS. 9A, 9B, and 9C, aspects of the motor cooling system are displayed. In some aspects, the cooling system may have air cooling through the rotor structure, and liquid cooling within the stator structure. The liquid cooling system may use a heat exchanger which facilitates heat transfer from the liquid to airflow flowing through the vanes of the heat exchanger. The airflow through the rotor structure may also in part cool the fluid after exiting the rotor structure and then entering the heat exchanger. In addition, the cooling system may utilize a fan to promote further airflow. In some aspects, there is not air flow through the rotor structure.

The stator 342 is coupled to the inner race of a bearing. The rotor 343 is coupled to the outer race. The rotor 343 has a rotor support structure 315 adapted to support various components, including magnets 312. In an exemplary embodiment, the rotor support structure 315 may have metal face skins 360, 361 with an inner lattice structure 364 adapted to both be structurally supportive of the mechanical loads place on the rotor support structure while also allowing air to flow through the structure to cool the structure. Air may enter into the rotor support structure through voids 362 in a face skin 360. In some aspects, the air entry voids may be around the front of the outer periphery of the rotor support structure. The airflow through the rotor support structure may exit through the rear 363 of the structure.

The stator 342 may have structure adapted for internal flow, such as the portion 314 under the stator winding bars 313. There may be a fluid capture cover, such as a fiberglass cylindrical portion, around the outer circumference of the stator winding bars. The fluid capture cover allows for fluid to flow between the stator winding bars to allow for convective cooling of the stator winding bars and windings. Within the stator is a fluid flow structure 316 which routes fluid from the fluid pump 317, through the fluid flow structure 316, forward through the stator support structure 314, back around through the stator winding bars 313 and under the fluid capture cover, and through heat exchangers 319.

Air flow through the heat exchangers may be a combination of air exiting the rear of the rotor support structure 315 and other air inletting through the air gap 304 between the external surface of the rotor 302 and the nacelle 303. In some aspects, there is a solid rotor support structure, wherein the airflow into the heat exchangers does not travel through the rotor structure. After flowing through the heat exchanger 319 the fluid then routes back through the fluid flow structure 316 to the fluid pump 317. An air fan 318 also facilitates airflow through the heat exchangers 319. Although shown in expanded view in FIG. 9A, the air fan 318 may be coupled to the fan 318. In some aspects, the fluid pump 317 may be driven by a motor to drive fluid through the fluid system. In some aspects, the air fan 318 may be driven by a motor to pull air through the heat exchangers. In some aspects, the same motor may drive both the air fan and the fluid pump. In some aspects, inletted air flowing through the heat exchangers may then drive the fan, which in turn drives the fluid pump.

Figure 10A:
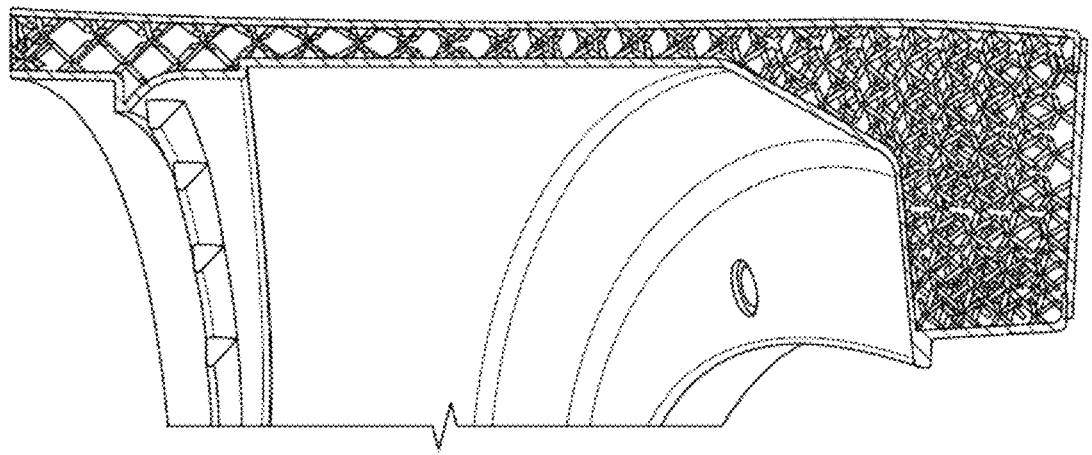
FIG. 10A is a photograph of a rotor structure adapted for internal cooling according to some embodiments of the present invention.
Figure 10B:
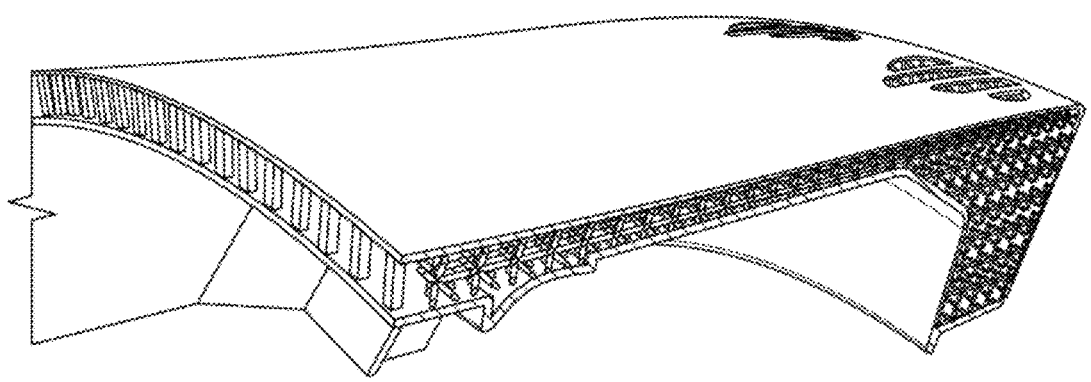
FIG. 10B is a photograph of a rotor structure adapted for internal cooling according to some embodiments of the present invention.
Figure 10C:
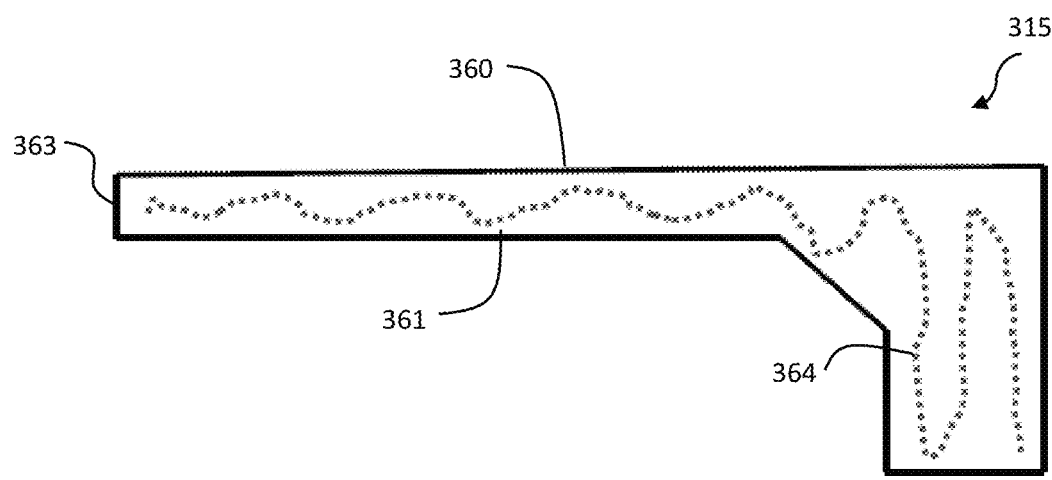
FIG. 10C is a side cutaway view of a rotor structure adapted for internal cooling according to some embodiments of the present invention.
Figure 10D:
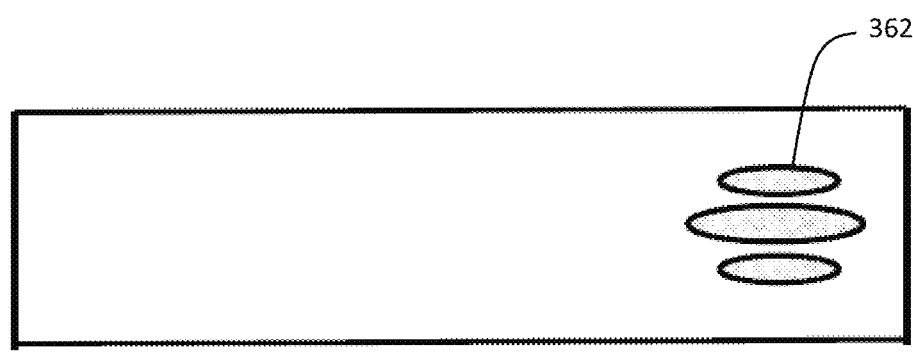
FIG. 10D is a top partial view of a rotor structure adapted for internal cooling according to some embodiments of the present invention.
Figure 12:
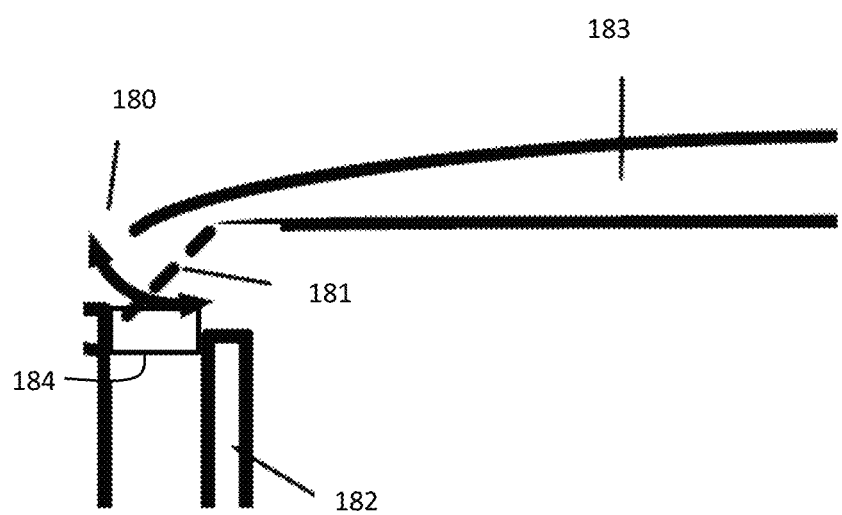
FIG. 12 is a representational view of a bypass mechanism according to some embodiments of the present invention.

FIGS. 10A and 10B are photographs of an exemplary portion of a rotor support structure according to some embodiments of the present invention. As seen in side view in FIG. 12, and as seen in FIGS. 10C and 10D, the rotor support structure has a top solid surface and bottom solid surface with a lattice work support structure in between. In some aspects, the rotor support structure may be unitary piece constructed using 3D printing of metal. As seen in FIG. 10D, a series of voids in the outer circumference of the top solid surface allow for airflow entry into the interior lattice work. The airflow is then able to exit the interior lattice work of the rotor support structure via the outer surface of the rotor support structure.

Figure 11:
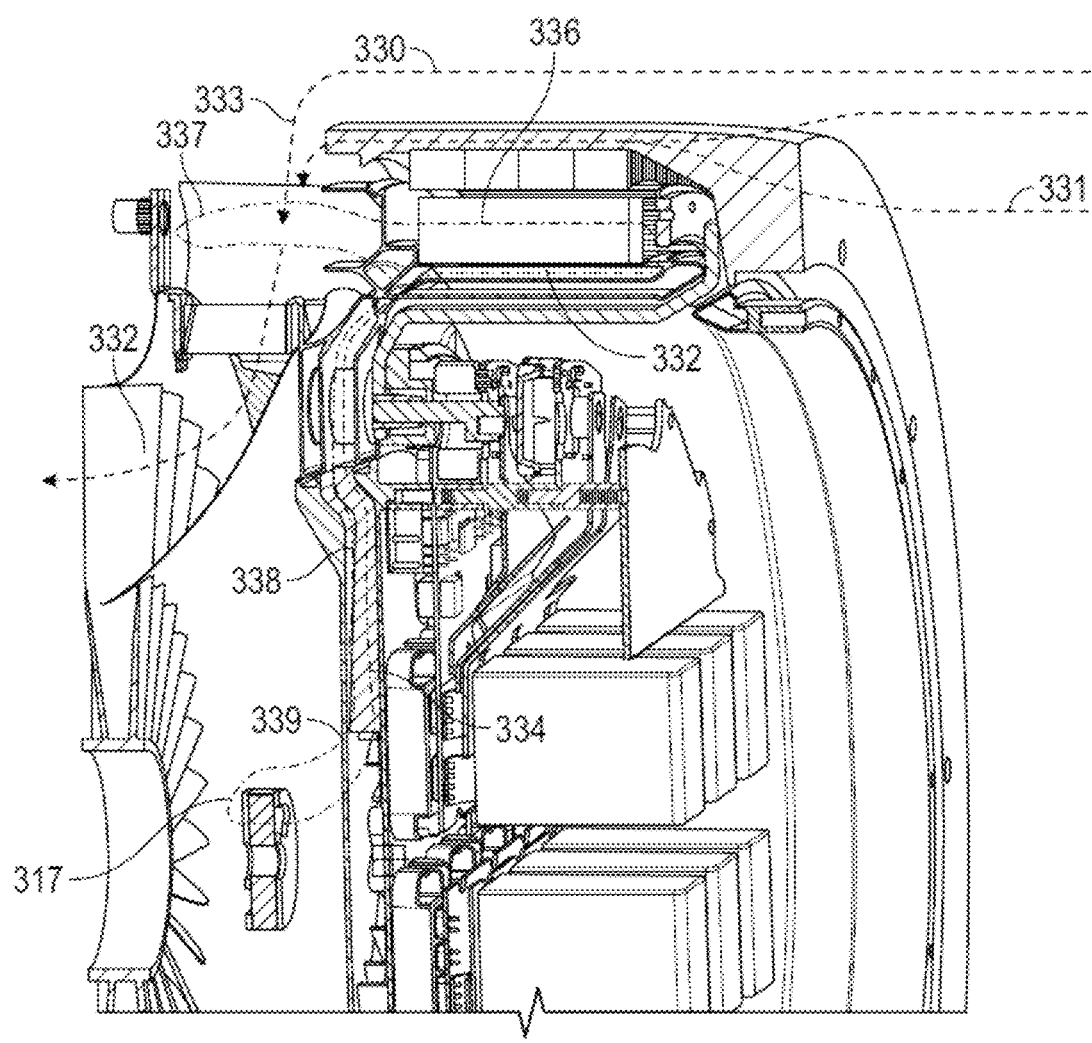
FIG. 11 is view of the cooling subsubsystem flow paths according to some embodiments of the present invention.

FIG. 11 illustrates air and fluid flow through a liquid cooled electric motor according to some embodiments of the present invention. FIG. 11 is a cutaway view with the pump 317 and the fan 318 in exploded view positions for clarity. In an exemplary embodiment, fluid resides within in the fluid flow structure 316 and flows from the pump 317 and flows radially outward 334 within outflow passages within the fluid flow structure 316, which may be part of or coupled to the stator support structure. Heat generating electrical components may be mounted onto forward side of the fluid flow structure and the fluid within the fluid flow structure may cool those components. The fluid then flows 332 within the stator support structure 314 in an area adjacent to and radially inward from the winding bars and windings. The fluid then exits the interior of the stator support structure 314 at the front of the stator support structure and then routes rearward 336 through the winding bars 313 and windings and radially within the fluid capture cover. The fluid then flows 337 through the heat exchangers 319 where it is cooled by airflow through the heat exchanger. Finally, the fluid flows 338 through return passages within the fluid flow structure and into the pump 317.

Airflow through the motor enters through a path 331 through the rotor support structure 315. Some or all of the airflow exiting the rotor support structure may also then enter into the heat exchangers 319. Airflow also flows 330 around the exterior of the rotor and flows down 333 through the heat exchangers 319. Both the external airflow 330 and the internal airflow 331 may enter through the airflow gap 304. In the case of a solid rotor no air will flow through the rotor support structure. The air fan 318 may also draw air in and through the airflow system described above. In some aspects, the air fan may be used to draw in a significant amount of air in order to have a beneficial influence aircraft aerodynamics. In some aspects, such as in hover mode, the air fan may be the primary driver for air flow through the heat exchangers. The relatively narrow gap between the motor and nacelle is used to ingest the boundary layer formed on the motor, which helps to clean up the boundary layer flow on the nacelle itself, promoting laminar flow on the nacelle and therefore reducing drag. In some aspects, the nacelle is shaped to take advantage of this beneficial influence. In some embodiments, there is no flow airflow through the rotor structure. In such embodiments, all airflow into the heat exchangers, or into the bypass ducts, is the external airflow 330.

In an exemplary embodiment, the coolant pump may be pumping in the range of 10-15 liters per minute of coolant, which may be a polyalphaolefin coolant. The coolant temperature entering the heat exchanger may be approximately 85 C and upon exit may be 70 C. This may occur with the motor running at a continuous hover power of 75.5 kW and 1030 Nm torque while running at 700 rpm. The motor may reject 6.3 kW of heat in this scenario. The fan airflow may vary between 800-1500 cfm.

The flow moderator 181 can be arranged in various positions relative to the bypass duct 183 and may be used to moderate or direct the flow or flow volume of the inletted air. The inletted air may enter through the inlet 180 and a portion of the airflow may bypass the heat exchanger 184 and enter the bypass duct 183. The fan 182 may be used to enhance the airflow volume. In some aspects, a flow moderator is used to change the proportion of flow volume which enters the bypass duct. In some aspects, an actuated system may engage mechanical flow directors, such as louvers, which can alter the flow volume into the bypass duct 183. In some aspects, the flow moderator may also alter the total amount of air inletted through the air inlet 180.

Figure 13:
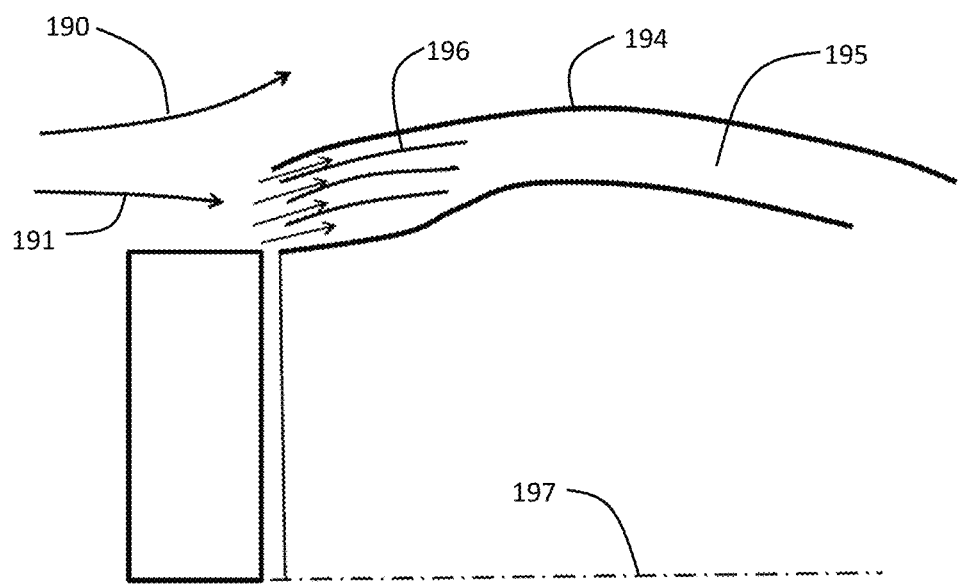
FIG. 13 is a partial cross-sectional side view of a diffuser according to some embodiments of the present invention.

In some embodiments of the present invention, as seen in FIG. 13, a multi-channel diffuser 196 is used to slow the inletted air 191 as it enters a bypass duct 195 in a system with a rotor rotating around an axis 197. The multi-channel diffuser 196 may reside within the nacelle 194 adjacent to or behind the air inlet and in the fore area of the bypass duct 195. In this exemplary embodiment, all of the inletted air 191 from the flowing air 190 flows through the diffuser and into ducting. In some aspects, the multi-channel diffuser may be used in the inletted airstream that then splits between entry into a thermal control system and a bypass duct. In some aspects, the multi-channel diffuser may be used in an inletted airstream which wholly through a thermal control system.

Figure 14:
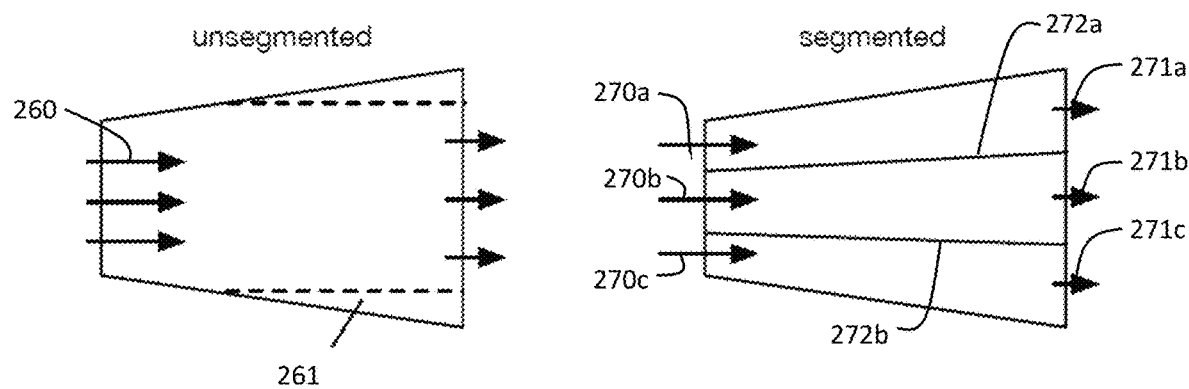
FIG. 14 presents representational views of flow paths according to some embodiments of the present invention.

FIG. 14 illustrates an advantage of the multi-channel diffuser relative to a single channel flow path. In the single channel flow path, inletted air 260 may separate 261 from the internal surfaces of the channel as the channel expands in volume. In a multi-channel diffuser, the air flows 270a, 270b, 270c through channels separated by diffuser layers 271a, 271b. The air 271a, 271b, 271c exiting from the channels within the multi-channel diffuser has not separated from the internal surfaces of the channel.

Figure 15A:
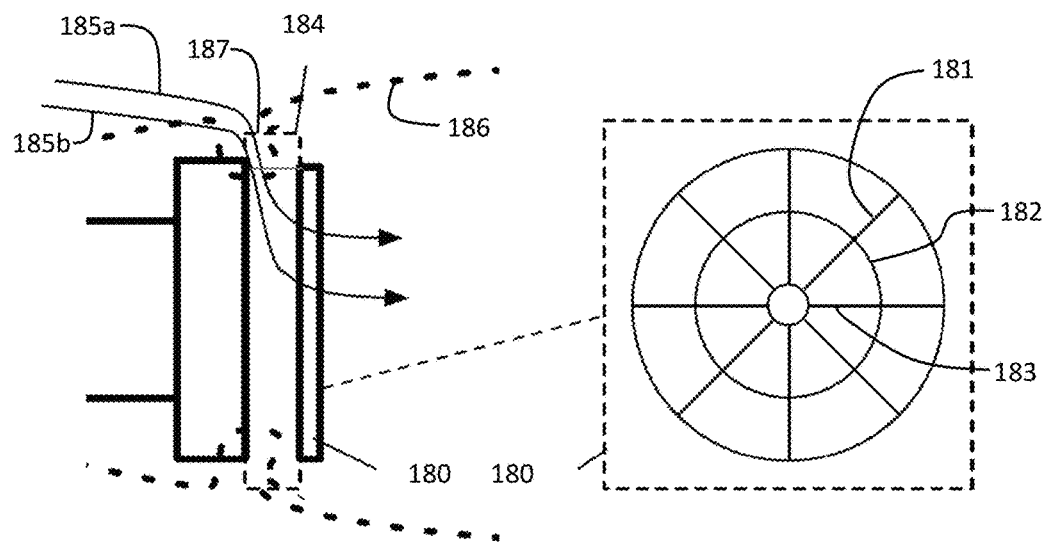
FIG. 15A presents representation views of flow paths using a segmented fan according to some embodiments of the present invention.
Figure 15B:
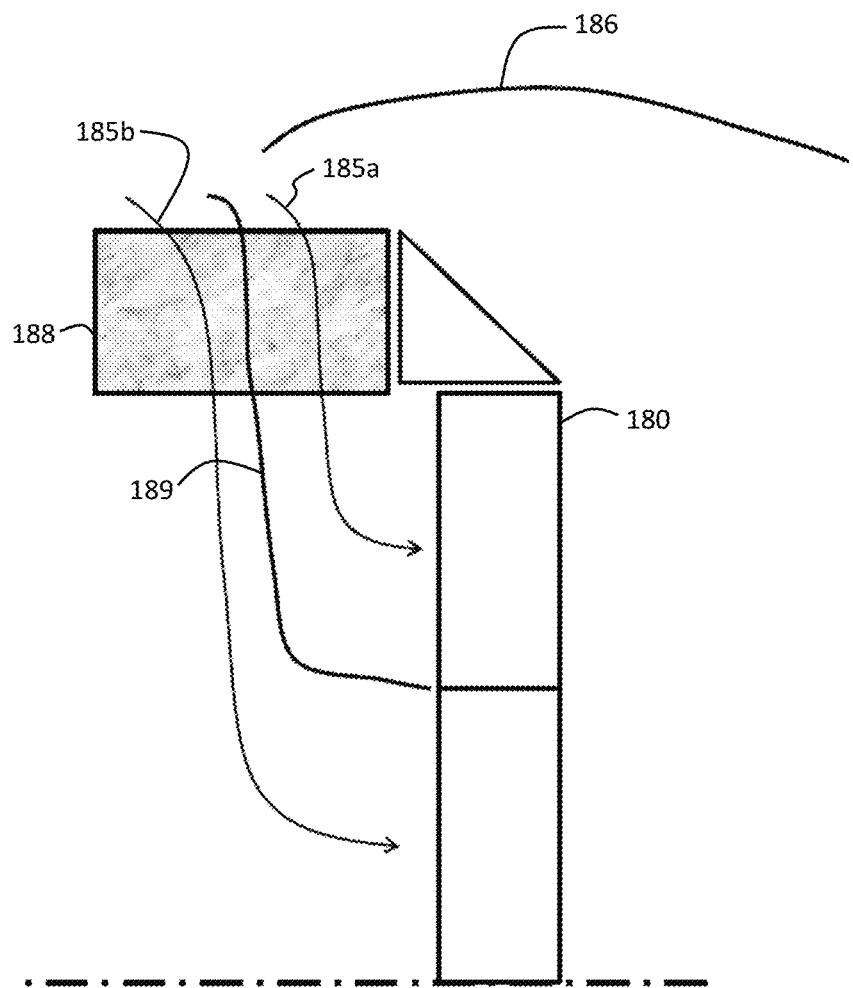
FIG. 15B is a representational view of flow paths using a partitioned diffuser routing to a segmented fan according to some embodiments of the present invention.

In a variation, as shown in FIG. 15A, the airflow path can flow into a segmented fan 180. The segmented fan 180 is preferably configured to correspond to a segmented diffuser of the nacelle, as seen in FIG. 15B, but can be otherwise suitably configured. In this variation, the segmented fan 180 can function to extract momentum from the flow at a first segment 181 (e.g., an outer segment of concentric segments) and supply momentum to the flow at a second segment 183 (e.g., an inner segment of concentric segments). The segmented fan 180 may include a separator 182, such as a cylindrical separator. In an exemplary case, inletted air 185a, 185*b* may travel on different sides of a diffuser plate 189. The diffuser plate 189 may begin on the outboard side of the heat exchanger 188 at the forward area of the nacelle 186. The diffuser plate concentrically separates the flow into the two airflow paths 185*a*, 185*b*. The channelized airflow provided by the diffuser plates may continue through the heat exchanger and into the interior of the nacelle.

Figure 15C:
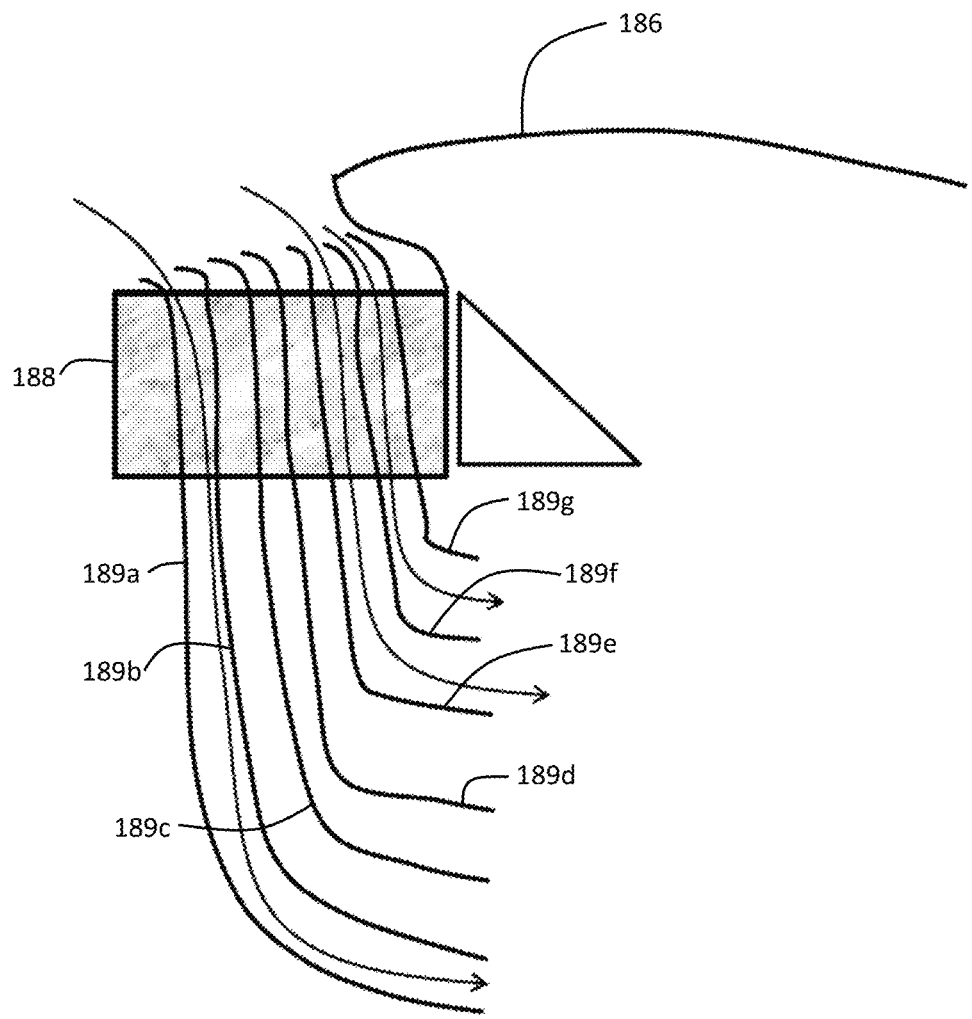
FIG. 15C is a representational view of flow paths using a partitioned diffuser according to some embodiments of the present invention.

In some embodiments of the present invention, as seen in FIG. 15C, a multi-channel diffuser has a plurality diffuser plates 189*a*, 189*b*, 189*c*, 189*d*, 189*e*, 189*f*, 189*g*. The diffuser plates may begin on the outboard side of the heat exchanger 188 at the forward area of the nacelle 186. The diffuser plate concentrically separates the flow into the different airflow paths. The channelized airflow provided by the diffuser plates may continue through the heat exchanger and into the interior of the nacelle. In some aspects, the diffuser plate structures also act as turning vanes for the airflow. It should be noted that a function of the channelizing diffuser is to separate areas of the air flow that have different total pressure. A function of the diffuser is to slow the flow and increase its pressure inside the nacelle.

The drag reduction portion preferably functions to reduce drag by promoting laminar flow over at least a portion of the outer surface of the nacelle, which is physically promoted by ingesting the boundary layer (e.g., a turbulent boundary layer) at the location between the rotor and the nacelle (e.g., the location where the boundary layer is most likely to be fully turbulent downstream of the rotor due to physical structural separation between the rotor and nacelle). After ingestion (e.g., via the inlet/air gap), the internal airflow is preferably expanded (e.g., via the diffuser) and decelerated such that the skin friction between the internal airflow and the drag reduction mechanism is reduced (e.g., proportionally to flow velocity reduction). This can result in a net drag reduction, in combination with the maintenance of laminar flow along the outer surface downstream of the inlet (e.g., and concomitant reduction in skin friction in comparison with a turbulent flow). The drag reduction portion also preferably minimizes internal pressure losses (e.g., in the diffuser, in the coupled heat exchanger, etc.). However, the drag reduction portion can additionally or alternatively reduce drag in any other suitable manner.

In variations, the drag reduction portion can be operated between various modes, including a full bypass mode, a partial bypass mode, and a no-bypass mode. In the full bypass mode, the flow through the drag reduction portion is not driven through the heat exchanger of the thermal management subsystem (e.g., the flow bypasses the heat exchanger). In the no-bypass mode, the entirety of the flow through the drag reduction portion is driven through the heat exchanger of the thermal management subsystem. In the partial bypass mode, the bypass fraction (e.g., the percentage of the flow through the drag reduction mechanism that bypasses the heat exchanger) is modulated. The partial bypass mode can function to manage possible pressure losses in the heat exchanger that can result from operating in the no-bypass mode at certain aircraft speeds; in such cases, the partial bypass mode can be utilized to direct a fraction of the ingested air between the inlet and outlet without passing the air through the heat exchanger to prevent too much airflow from being supplied to the heat exchanger (e.g., and causing pressure losses or other drag-inducing and/or efficiency reducing losses). The bypass fraction can be passively modulated (e.g., actuated by the flow field itself, as a function of flow velocity) and/or actively modulated (e.g., throttled by a controllable flow actuator such as a variable-size orifice, valve, etc.). The drag reduction portion is preferably operated between the operating modes using a bypass mechanism such as louvers which are driven by an electromechanical actuator that can redirect the airflow through the drag reduction portion and/or away from the drag portion mechanism, as shown by example in FIG. 12; however, the drag reduction portion can additionally or alternatively be otherwise suitable transitioned between the various operating modes and any other suitable operating modes.

In variations, the drag reduction portion can be passively operated. In an example of this variation, the components of the drag reduction portion are preferably static (e.g., the inlet size is fixed, the diffuser shape and size is fixed, the outlet size is fixed, etc.), and the airflow through the drag reduction portion can scale with the velocity of the system (e.g., the airspeed of the aircraft). In another example of this variation, the components of the drag reduction portion can be dynamically actuated by the flow field (e.g., wherein the pressure of the flow field applies a force to the outlet and increases or decreases the size of the outlet as a function of airspeed). However, the drag reduction portion can additionally or alternatively be passively operated in any suitable manner, and/or actively operated (e.g., by an actuatable variable-sized outlet, etc.).

The inlet of the drag reduction portion functions to ingest the airflow that moves passed the trailing edge of the cowling of the rotor. The inlet is preferably shaped to minimize and/or prevent flow separation, to promote laminar flow on the outer surface of the nacelle downstream of the inlet. However, the inlet can be otherwise suitably shaped. The drag reduction portion can be designed such that the amount of air ingested at a design airspeed has been tuned such that drag is minimized.

The inlet is preferably arranged proximal the separation region (e.g., gap) between the rotating external surface of the rotor system (e.g., the rotor) and the static external surface of the rotor system (e.g., the outer surface of the nacelle). In particular, the inlet is preferably arranged proximal the location at which the flow downstream of the rotor would stagnate on the rotor system in the absence of an inlet, to leverage the high-pressure zone resulting from the stagnation to drive airflow into the inlet (e.g., in addition to or alternatively to active flow actuation such as via a flow actuator or large negative pressure gradients between the outlet and the inlet). The inlet is preferably an annular region, but can additionally or alternatively be a partial annulus, a segmented annulus, and/or have any other suitable geometric configuration.

The outlet functions to reintroduce the internal airflow (e.g., from the diffuser) to the external freestream. The outlet can also function to restrict the flow rate through the drag reduction mechanism (e.g., passively via the outlet geometry, actively via actuation of the outlet size, etc.). The outlet can be arranged at various locations with respect to the outer surface of the nacelle. The outlet can be arranged at the outer surface, aft of the inlet, and upstream of the trailing edge or region of the nacelle. In an alternative variation, the outlet can be arranged at the trailing edge or region of the nacelle (e.g., in the wake of the nacelle). The outlet can be an annular region (e.g., in a similar manner as the inlet), a segmented annular region, a region located proximal to the inlet to minimize the impact of outflow through the outlet on downstream airflow, and/or have any other suitable geometric distribution or arrangement with respect to the nacelle geometry.

The outlet can be of fixed or variable geometry (e.g., cross-sectional size, diameter, shape, etc.). In variations wherein the outlet is of variable size, the size can be manually varied (e.g., via a control linkage, via a manually adjustable mechanical restrictor such as an iris or other orifice, via a fly-by-wire actuator, etc.) or automatically varied (e.g., via a closed loop controller, via a speed-dependent variable throttle, etc.).

Figure 16A:
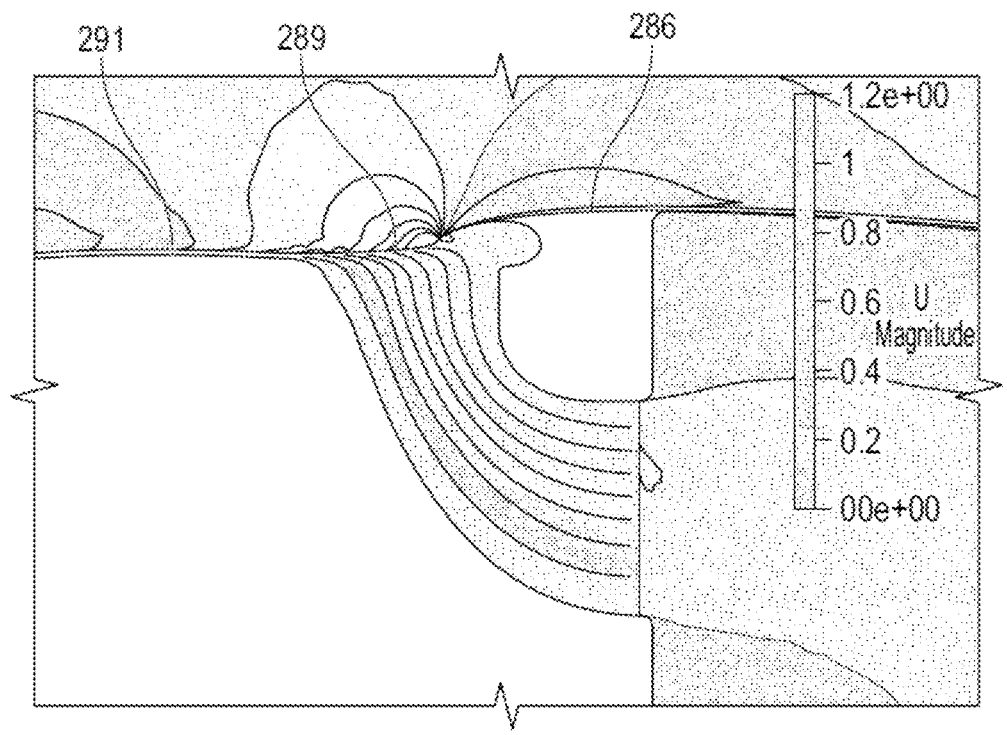
FIG. 16A illustrates velocity distributions through a partitioned diffuse according to some embodiments of the present invention.
Figure 16B:
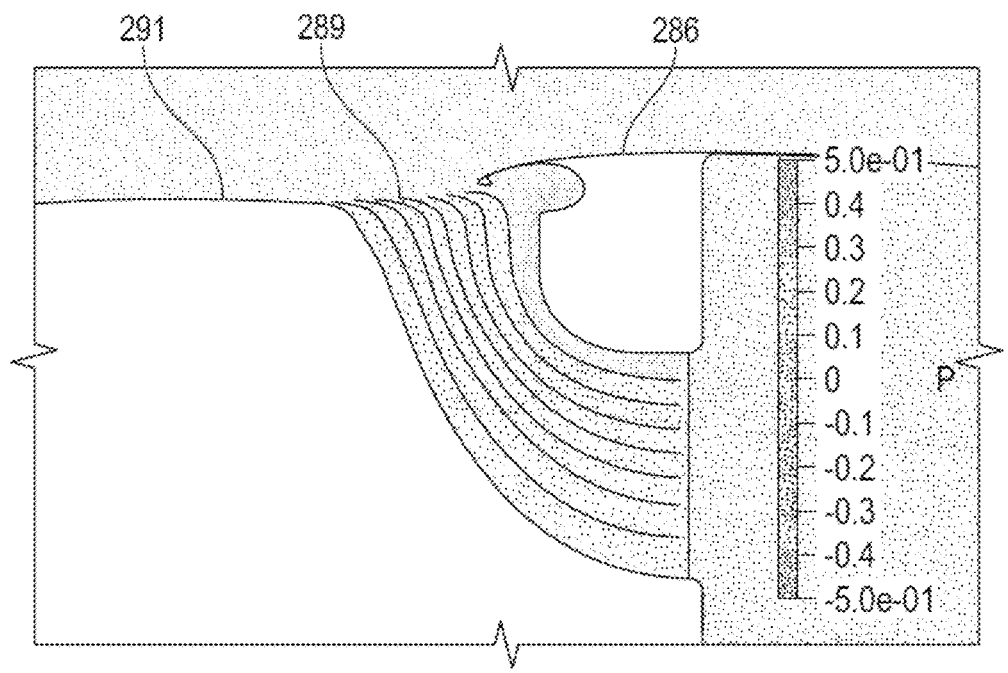
FIG. 16B illustrates pressure distributions through a partitioned diffuse according to some embodiments of the present invention.

FIG. 16A is a velocity magnitude modeling output for the velocity of airflow through a diffuser 289 as it enters into the interior of a nacelle 286. The airflow flows past the exterior surface of the rotor 291 and enters into an air gap between the rotor 291 and the nacelle 286. The diffuser 289 is a multi-channel diffuser with a plurality of diffuser plates. As illustrated in FIG. 16A, the velocity of the airflow has slowed in the diffuser and through the nacelle. As seen in the pressure distribution modeling output of FIG. 16B, an increased pressure is seen just outboard of the diffuser, and throughout the diffuser and nacelle. As seen in FIG. 16B, the use of a multi-channel diffuser with a plurality of diffuser plates segregates higher pressure to the channels axially rearward, preventing recirculation of air in the overall flow channel. At the rearward end of the diffuser plates a fan works to even the pressure rearward of the fan by momentum transfer, as discussed above. The pressure differences within the diffuser channels are a fraction of the external flow dynamic pressure. In some aspects, the pressure differences within the diffuser channel are in the range of 5% to 100% of the external dynamic pressure. In some aspects, the pressure differences within the diffuser channel are in the range of 10% to 50% of the external dynamic pressure.

Figure 19A:
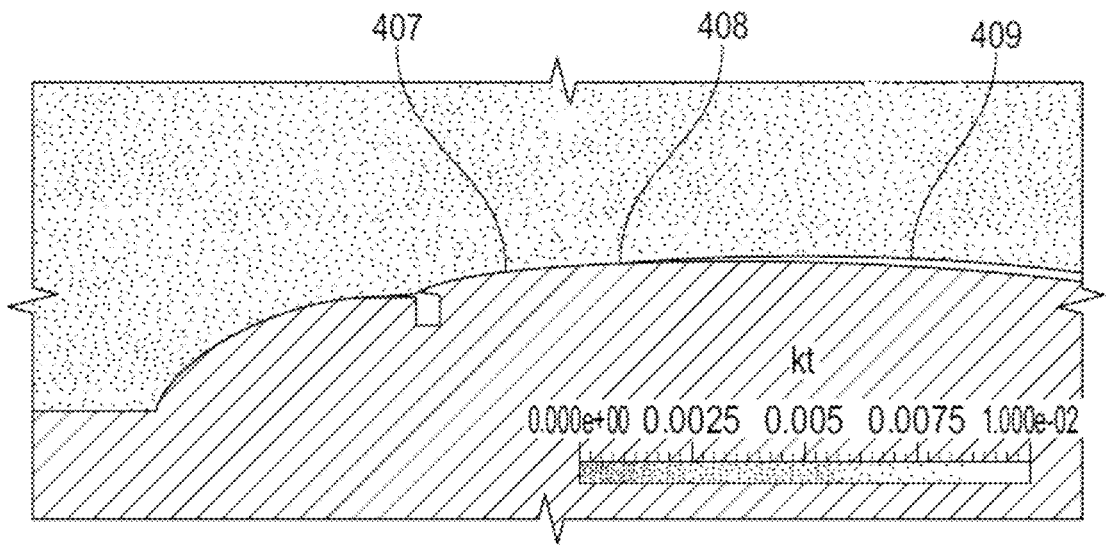
FIG. 19A is a view of suction velocity at 20% suction velocity fraction.
Figure 19B:
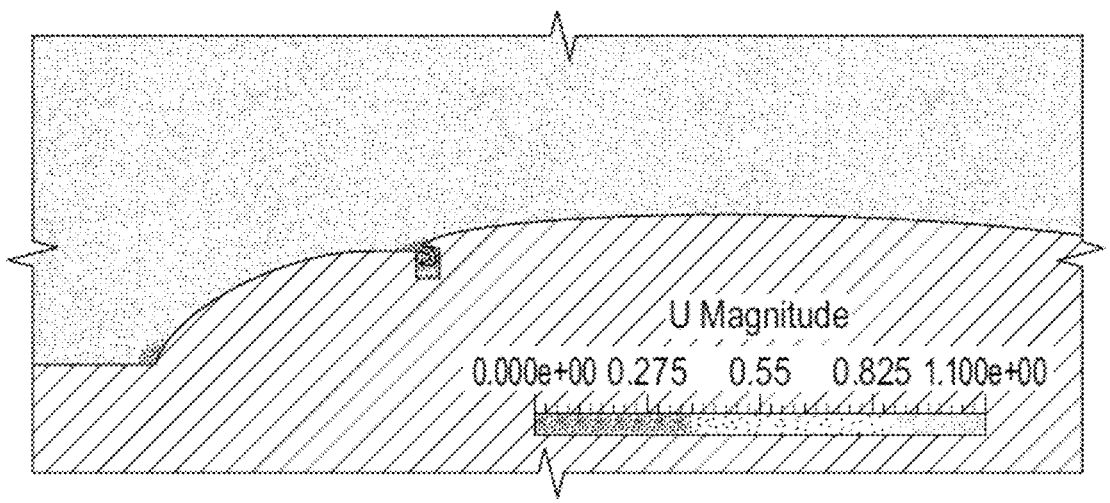
FIG. 19B is a view of turbulent intensity at 20% suction velocity fraction.
Figure 20:
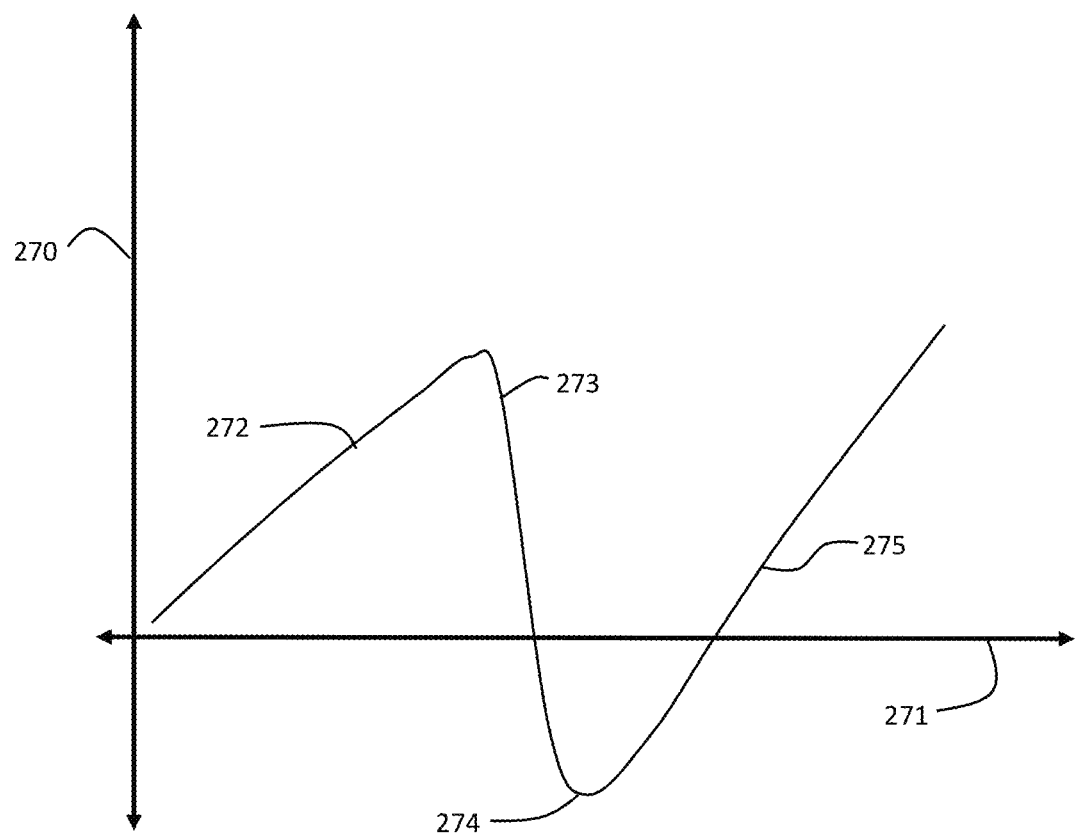
FIG. 20 is a graph of energy loss vs. volume flow rate ratio according to some embodiments of the present invention.

A design parameter for the design and tuning of the drag reduction portion of systems according to some embodiments of the present invention is the volume flow fraction. The volume flow fraction is defined as the ratio of the volume flow rate of the inletted air to the volume flow rate of the boundary layer at the rear of the rotor and forward of the inlet. FIG. 20 illustrates the energy loss 270 vs. the volume flow ratio 271. The horizontal axis 271 is set at the level of energy loss seen in a baseline system without ingestion of inletted air. As seen, as air is inletted the energy loss goes up 272 due to internal losses. As more air is inletted, a point is reached where the energy losses go down 273. This is due to restoral of laminar flow on the external surface of the nacelle, as seen in FIG. 19A. A low energy loss point 274 may be reached that represent less energy loss than the baseline system without ingestion of inletted air. With even more inletted air, the internal losses rise and the overall energy loss increases 275. In some aspects, the volume flow fraction is greater than 0.1. In some aspects, the volume flow fraction is greater than 0.2. In some aspects, the volume flow fraction is greater than 0.5. In some aspects, the volume flow fraction is greater than 1.0. In some aspects, the volume flow fraction is greater than 2.0.

A method for the reduction of energy losses of an aircraft may comprise the steps of ingesting air in an area rearward of the rotor, routing the air into a diffuser, and outletting the air. The diffuser may route all or part of the ingested air through a thermal management system. A bypass pass duct may be utilized to increase the volume flow rate of ingested air.

Figure 17A:
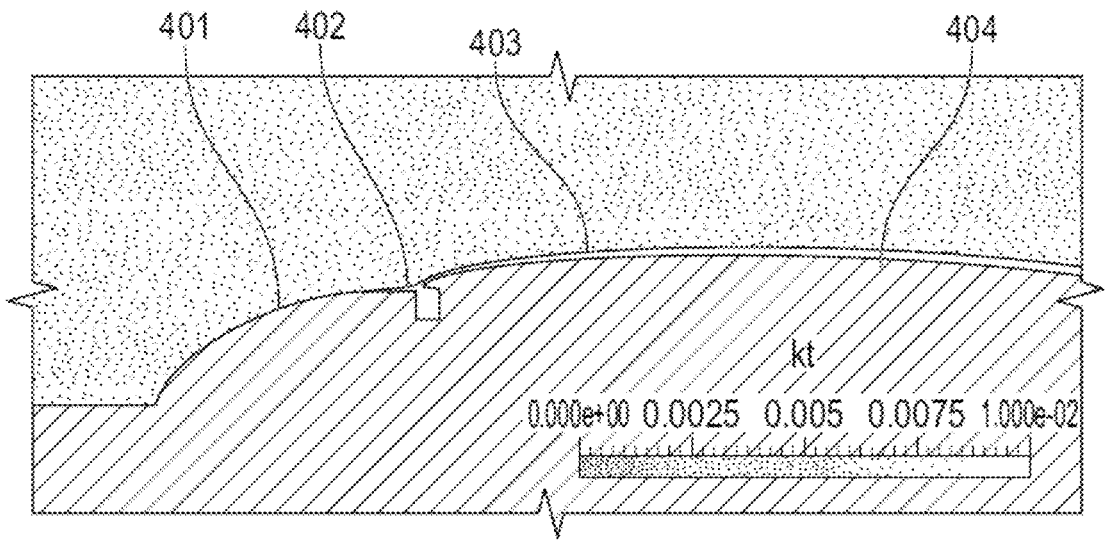
FIG. 17A is a view of suction velocity at 0% suction velocity fraction.
Figure 18A:
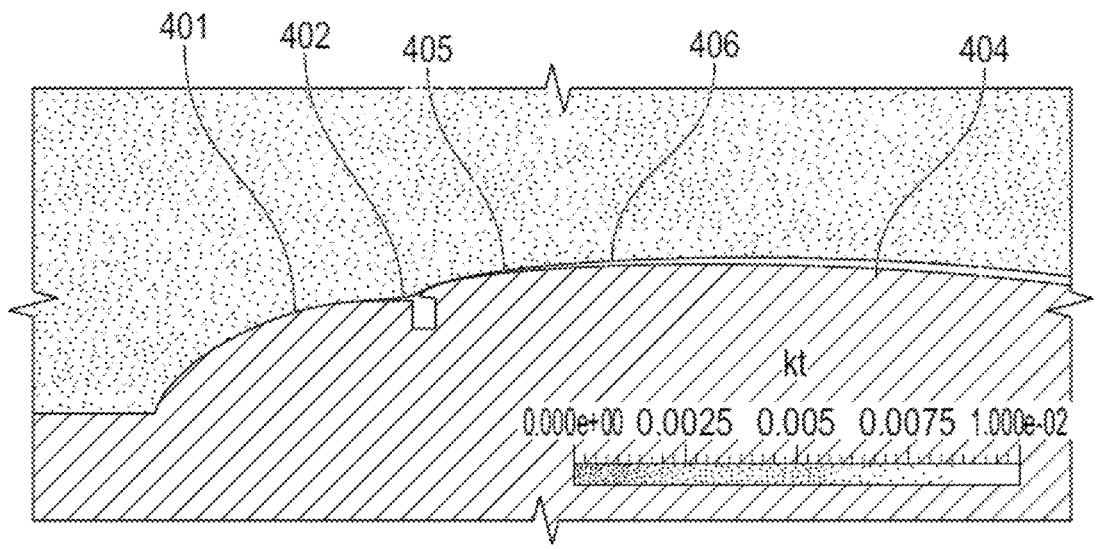
FIG. 18A is a view of suction velocity at 10% suction velocity fraction.

FIGS. 17A, 18A, and 19A illustrate the turbulent intensity at 0%, 10%, and 20% suction velocity fractions, respectively. The turbulent intensity is the fraction of turbulent energy fluctuations in freestream relative to flow energy density. The brighter area indicates more turbulent flow. The suction velocity fraction represents the suction velocity fraction of freestream. At 0% suction velocity fraction, as seen in FIG. 17A, the spinner 401 is relatively free of a turbulent boundary layer. As the flow approaches the air gap inlet 402, turbulence begins. In this example there is no suction velocity at the air gap inlet 402. A turbulent layer 403 is seen all along the nacelle 404. At 10% suction velocity fraction, as seen in FIG. 18A, the spinner 401 is relatively free of a turbulent boundary layer. As the flow approaches the air gap inlet 402, turbulence begins. In this example there is 10% suction velocity fraction at the air gap inlet 402. A thinning of the turbulent layer 405 is seen all along the nacelle 404 just after the air gap inlet 402. The turbulent layer later thickens downstream 406. At 20% suction velocity fraction, as seen in FIG. 19A, the spinner 401 is relatively free of a turbulent boundary layer. As the flow approaches the air gap inlet 402, turbulence begins. In this example there is 20% suction velocity fraction at the air gap inlet 402. A significant thinning 407, if not elimination, of the turbulent layer 405 is seen all along the nacelle 404 just after the air gap inlet 402. The turbulent layer then begins 408 and later thickens downstream 406.

Figure 17B:
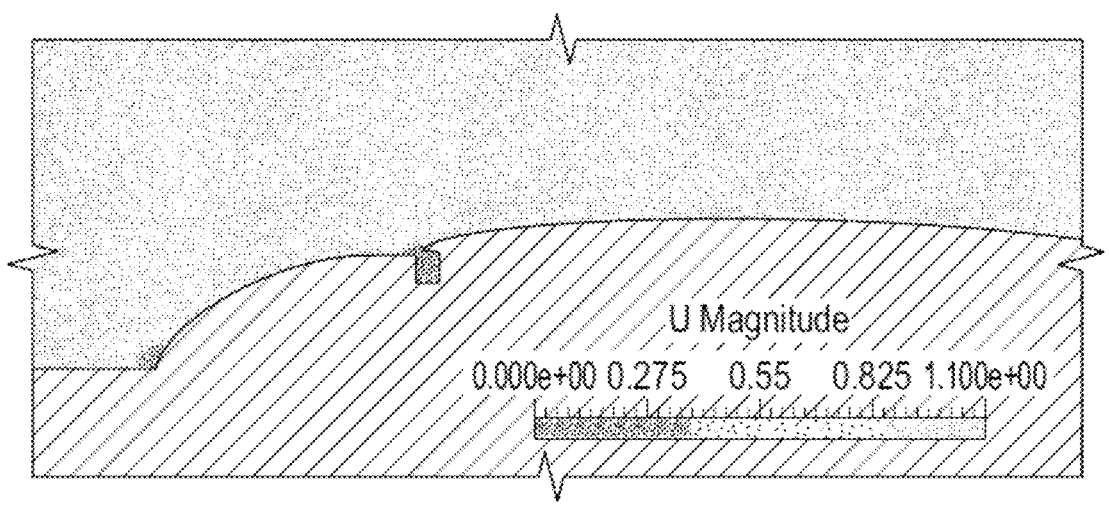
FIG. 17B is a view of turbulent intensity at 0% suction velocity fraction.
Figure 18B:
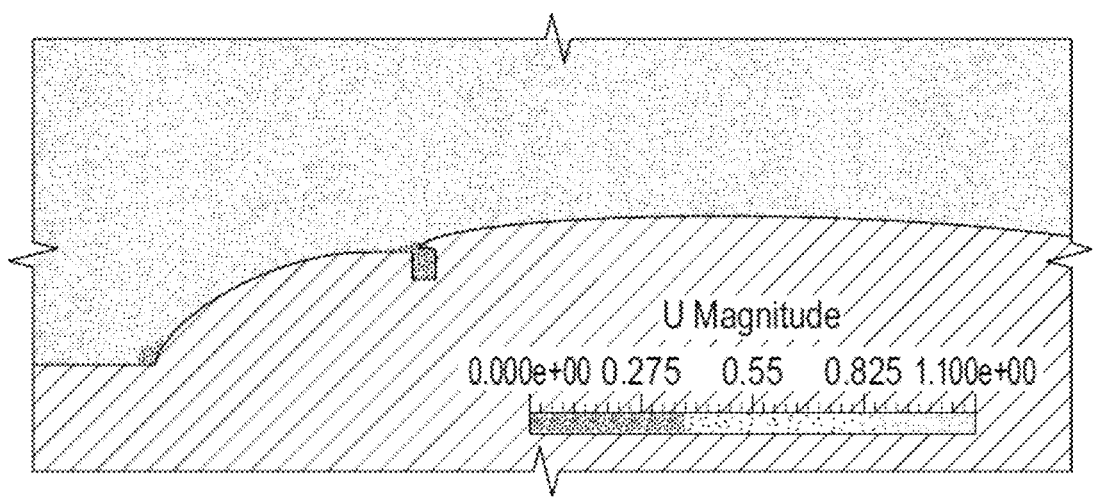
FIG. 18B is a view of turbulent intensity at 10% suction velocity fraction.

FIGS. 17B, 18B, and 19C illustrate the velocity at 0%, 10%, and 20% suction velocity fractions, respectively. These results illustrate that the flow picture outside the nacelle does not chamber much with the change in suction velocity fraction.

In some embodiments, an aircraft may draw in air actively to cause, or cause to increase, the suction velocity at the air gap inlet. In some aspects, air may be drawn in actively in order to cool the electric motor, as described above. In some aspects, air may be drawn in actively regardless of whether that air is used specifically for motor cooling.

As seen, the quality of the flow on the nacelle drastically changes between 10% and 20% suction. In some aspects, the suction velocity fraction is greater than 10%. In some aspects, the suction velocity fraction is greater than 15%. In some aspects, the suction velocity fraction is greater than 20%.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An electric motor assembly, said electric motor assembly comprising:
   an internal stator; and
   an external rotor, wherein said rotor comprises:
      an outer solid surface;
      an inner solid surface; and
      a supporting lattice between said outer surface and said inner solid surface,
   a front end and a rear end, wherein said solid outer solid surface comprises an airflow entry at said front end of said electric motor assembly and an airflow exit at said rear end of said electric motor assembly.

2. An electric motor assembly, said electric motor assembly comprising:
   an internal stator;
   an external rotor, wherein said rotor comprises:
      an outer solid surface;
      an inner solid surface; and
      a supporting lattice between said outer surface and said inner solid surface: and a front end and a rear end, and wherein said outer solid surface of said external rotor comprises voids in an outer circumference of the outer solid surface at the front end of said electric motor assembly, said voids adapted for airflow entry in said supporting lattice.

3. The electronic motor assembly of claim 2 wherein said supporting lattice is exposed at the rear end of said electric motor assembly between said outer solid surface and said inner solid surface, thereby creating an airflow passage between said voids at the front end of the outer solid surface and the exposed supporting lattice at the rear end of said electric motor assembly.

4. The electronic motor assembly of claim 2 wherein said external rotor further comprises a mounting surface along a front of said external rotor, said mounting surface between said outer solid surface and said inner solid surface.

5. The electronic motor assembly of claim 3 wherein said external rotor further comprises a mounting surface along a front of said external rotor, said mounting surface between said outer solid surface and said inner solid surface.

6. The electronic motor assembly of claim 3 wherein said external rotor further comprises a plurality of magnets coupled to an interior surface of said external rotor.

7. The electronic motor assembly of claim 6 wherein said internal stator comprises:
   a plurality of winding bars;
   a stator support structure, said stator support structure comprising a fluid flow structure radially internal to said plurality of winding bars, wherein said plurality of wind bars is coupled to said stator support structure; and
   a fluid capture cover radially outward of said plurality of winding bars, wherein said external rotor is rotationally coupled to said internal stator.

8. An electric motor assembly, said electric motor assembly comprising:
   an internal stator;
   an external rotor, wherein said rotor comprises:
      an outer solid surface;
      an inner solid surface; and
      a supporting lattice between said outer surface and said inner solid surface: and
   a plurality of magnets coupled to an interior surface of said external rotor.

9. The electronic motor assembly of claim 8 wherein said internal stator comprises:
   a plurality of winding bars;
   a stator support structure, said stator support structure comprising a fluid flow structure radially internal to said plurality of winding bars, wherein said plurality of wind bars is coupled to said stator support structure; and
   a fluid capture cover radially outward of said plurality of winding bars, wherein said external rotor is rotationally coupled to said internal stator.

10. The electronic motor assembly of claim 9 wherein said electronic motor assembly further comprises:
   cooling fluid; and
   a fluid pump, said fluid pump configured to pump said fluid around said plurality of winding bars within said fluid capture cover.

11. The electronic motor assembly of claim 7 wherein said electronic motor assembly further comprises:
   cooling fluid; and
   a fluid pump, said fluid pump configured to pump said fluid around said plurality of winding bars within said fluid capture cover.

* * * * *